United States Patent
Horikoshi

(10) Patent No.: US 9,253,312 B2
(45) Date of Patent: Feb. 2, 2016

(54) SOUND OUTPUT SETTING SYSTEM FOR INFORMATION PROCESSING TERMINAL

(75) Inventor: Takashi Horikoshi, Kawasaki (JP)

(73) Assignee: NEC Platforms, Ltd., Kanagawa (JP)

( * ) Notice: Subject to any disclaimer, the term of this patent is extended or adjusted under 35 U.S.C. 154(b) by 2082 days.

(21) Appl. No.: 12/014,519

(22) Filed: Jan. 15, 2008

(65) Prior Publication Data

US 2008/0175231 A1 Jul. 24, 2008

(30) Foreign Application Priority Data

Jan. 22, 2007 (JP) ................................. 2007-011054

(51) Int. Cl.
- *H04L 12/66* (2006.01)
- *H04M 3/42* (2006.01)
- *H04L 29/06* (2006.01)

(52) U.S. Cl.
CPC ....... *H04M 3/42017* (2013.01); *H04L 65/1006* (2013.01); *H04M 2203/554* (2013.01)

(58) Field of Classification Search
CPC .......... H04L 65/1006; H04M 3/42017; H04M 2203/554
See application file for complete search history.

(56) References Cited

U.S. PATENT DOCUMENTS

| | | | |
|---|---|---|---|
| 7,411,984 B1 * | 8/2008 | Moth et al. ..................... | 370/525 |
| 2006/0077957 A1 * | 4/2006 | Reddy et al. .................. | 370/352 |
| 2006/0258405 A1 | 11/2006 | Gonzalez | |
| 2007/0014314 A1 * | 1/2007 | O'Neil .......................... | 370/503 |
| 2007/0127707 A1 | 6/2007 | Koser et al. | |

FOREIGN PATENT DOCUMENTS

| | | |
|---|---|---|
| EP | 1624661 A2 | 2/2006 |
| EP | 1708468 A1 | 10/2006 |
| JP | 2004-312357 A | 11/2004 |
| KR | 2005-0000145 A | 1/2005 |

\* cited by examiner

*Primary Examiner* — Luat Phung
(74) *Attorney, Agent, or Firm* — Sughrue Mion, PLLC

(57) ABSTRACT

The sound output setting system for information processing terminals is provided, capable of outputting a desired call progress tone from a terminal to be heard by the user easily with simple configuration. The system includes a SIP server and information processing terminals connected via a LAN using SIP. The SIP server has a tone management table for defining and recording types of sounds output by the information processing terminals in association with their identification codes, and an audio file storage region for recording audio files corresponding to the identification codes. The information processing terminal has a client application unit, which acquires a management table from the tone management table and an audio file from the audio file storage region at a predetermined time, and compares them with recorded data in its own tone management table region and audio file storage region to update the recorded data.

6 Claims, 17 Drawing Sheets

FIG. 2A 13-1

| TONE ID | TONE TYPE | AUDIO FILE | NUMBER OF REPRODUCTIONS |
|---------|-----------|------------|-------------------------|
| 1 | DT | DT_JPN.WAV | ENDLESS |
| 2 | SDT | SDT_JPN.WAV | ENDLESS |
| 3 | RBT | RBT_JPN.WAV | ENDLESS |
| 4 | BT | BT_JPN.WAV | 30 |
| 5 | ROT | ROT_JPN.WAV | 30 |
| 6 | SDT | SDT_JPN.WAV | ENDLESS |
| 7 | RING-A | RING_A.WAV | ENDLESS |
| 8 | S1-TONE | S1_TONE.WAV | 1 |
| ⋮ | ⋮ | ⋮ | ⋮ |

FIG. 2B 13-2

| TONE ID | TONE TYPE | AUDIO FILE | NUMBER OF REPRODUCTIONS |
|---------|-----------|------------|-------------------------|
| 1 | DT | DT_JPN.WAV | ENDLESS |
| 2 | SDT | SDT_USA.WAV | ENDLESS |
| 3 | RBT | RBT_JPN.WAV | ENDLESS |
| 4 | BT | BT_JPN.WAV | 30 |
| 5 | ROT | ROT_JPN.WAV | 30 |
| 6 | SDT | SDT_JPN.WAV | ENDLESS |
| 7 | RING-B | RING_B.WAV | ENDLESS |
| 8 | S1-TONE | S1_TONE.WAV | 1 |
| ⋮ | ⋮ | ⋮ | ⋮ |

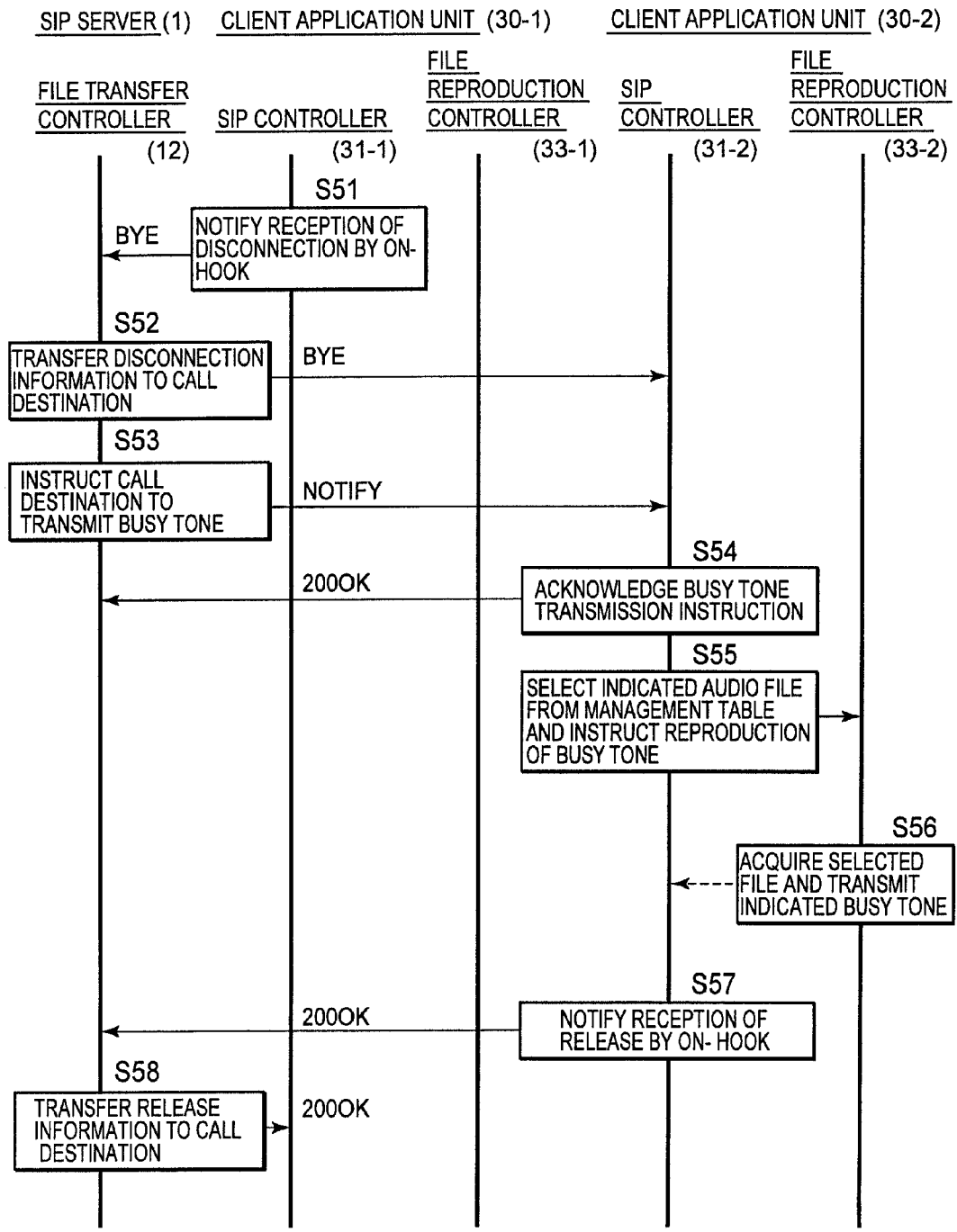

FIG. 8A 13A-1

| TONE ID | TONE TYPE | AUDIO FILE | NUMBER OF REPRODUCTIONS |
|---------|-----------|------------|-------------------------|
| 1 | DT | DT_JPN.A.WAV | ENDLESS |
| 2 | SDT | SDT_JPN.A.WAV | ENDLESS |
| 3 | RBT | RBT_JPN.A.WAV | ENDLESS |
| 4 | BT | BT_JPN.A.WAV | 30 |
| 5 | ROT | ROT_JPN.A.WAV | 30 |
| 6 | SDT | SDT_JPN.A.WAV | ENDLESS |
| 7 | RING | RING_A.WAV | ENDLESS |
| 8 | S1-TONE | S1_TONE.A.WAV | 1 |
| ⋮ | ⋮ | ⋮ | ⋮ |

FIG. 8B 13A-2

| TONE ID | TONE TYPE | AUDIO FILE | NUMBER OF REPRODUCTIONS |
|---------|-----------|------------|-------------------------|
| 1 | DT | DT_JPN_B.MP3 | ENDLESS |
| 2 | SDT | SDT_US_B.MP3 | ENDLESS |
| 3 | RBT | RBT_JPN_B.MP3 | ENDLESS |
| 4 | BT | BT_JPN_B.MP3 | 30 |
| 5 | ROT | ROT_JPN_B.MP3 | 30 |
| 6 | SDT | SDT_JPN_B.MP3 | ENDLESS |
| 7 | RING | RING_B.MP3 | ENDLESS |
| 8 | S1-TONE | S1_TONE_B.MP3 | 1 |
| ⋮ | ⋮ | ⋮ | ⋮ |

FIG. 11

| TONE ID | TONE TYPE | AUDIO FILE | NUMBER OF REPRODUCTIONS | TEXT FILE | MULTIMEDIA FILES |
|---|---|---|---|---|---|
| 1 | DT | DT_JPN.WAV | ENDLESS | DT_JPN.TEXT | DT.AVI |
| 2 | SDT | SDT_JPN.WAV | ENDLESS | SDT_JPN.TEXT | SDT.AVI |
| 3 | RBT | RBT_JPN.WAV | ENDLESS | RBT_JPN.TEXT | RBT.AVI |
| 4 | BT | BT_JPN.WAV | 30 | BT_JPN.TEXT | BT.AVI |
| 5 | ROT | ROT_JPN.WAV | 30 | ROT_JPN.TEXT | ROT.AVI |
| 6 | SDT | SDT_JPN.WAV | ENDLESS | SDT_JPN.TEXT | SDT.AVI |
| 7 | RING | RING_A.WAV | ENDLESS | RING_A.TEXT | RING_A.AVI |
| 8 | S1-TONE | S1_TONE.WAV | 1 | S1_TONE.TEXT | S1_TONE.JPG |
| ... | ... | ... | | ... | ... |

13B

SOUND OUTPUT SETTING SYSTEM FOR INFORMATION PROCESSING TERMINAL

This application is based upon and claims the benefit of priority from Japanese patent application No. 2007-011054, filed on Jan. 22, 2007, the disclosure of which is incorporated herein in its entirety by reference.

BACKGROUND OF THE INVENTION

1. Field of the Invention

The present invention relates to a telephone system employing Internet Protocol (IP), and in particular to a sound output setting system for use in information processing terminals having a telephone terminal function and capable of easily setting and updating a received audio signal. The audio signal is a call progress tone signal, such as a signal of a dial tone (DT), ring-back tone (RBT), or busy tone (BT), received by the terminal.

2. Description of the Related Art

Currently, the conventional circuit-switching network architectures are being rapidly replaced with Internet architectures. This consequently increases the use of Session Initiation Protocol (SIP) as a communication protocol for Internet telephones employing Voice over IP (VoIP). The SIP is a communication protocol enabling a user to freely select a desired application or service by means of end-to-end control and mild and flexible management of networks and services. Some office telephone systems use a private branch exchange or key telephone system to form a communication network. However, there are some services among the existing services, that cannot be provided as a unified service in these systems by using the end-to-end control architecture.

In these existing services, call progress tones provided to users are included. The call progress tones are provided to a user prior to establishment of a media session at a telephone terminal. In the case of a circuit-switching network architecture, the services are managed by a centralized controller possessed by a telephone exchange for the purpose of controlling the same. This means that an audio channel is formed between the centralized controller and the telephone terminal prior to establishment of the session between the telephone terminals. Therefore, the user is allowed to hear a call progress tones such as a dial tones (DT) or ring-back tone (RBT) through a signal sound generated by the centralized controller. In the case of an end-to-end control architecture such as SIP, however, the call control is performed by means of a text type message through the communication protocol. Therefore, no audio channel is established until a called party responds to the call and a talk session is established. Consequently, the centralized controller does not intervene during the talk session. The call progress tone thus has to be generated by the telephone terminals. The telephone terminals are allowed to select freely a type of tones to be output. However, unified specifications are applied to design the exchanges and the telephone terminals. Thus, a complicated processing is required to unify the specifications thereof if the tones to be transmitted are to be unified in the system.

In order to solve such problems, office telephone system using SIP as a communication protocol employ an extended Back-to-Back User Agent (B2BUA) in which a SIP User Agent (SIPUA) is used as a central telephone equipment having an exchange function or a telephone exchange. According to this method, the telephone exchange communicates with a calling terminal and a called terminal while connecting their audio channels in the telephone exchange. In this case, a talk session is established between the telephone exchange and the telephone terminal, and a call progress tone formed by output sounds generated by the telephone exchange is heard at the telephone terminal. However, the SIP session state of the telephone terminal is different from the actual communication session state, which substantially reduces the design freedom of client applications using the SIP.

An improvement for solving this problem is disclosed, for example, in JP-2004-312357-A2 (Patent Document 1) relating to an Internet telephone system. According to the Patent Document 1, a telephone unit connected to the Internet receives streaming delivery of audio data from an audio server connected to the Internet, and a telephone terminal outputs the audio data. Using the streaming delivery, however, packet arrival delay is apt to occur when the network traffic is high. Further, troubles may occur such as clipping of the beginning of the tone sound and interruption of the tone sound when streaming delivery processing load is increased due to concentration of accesses to the audio server.

In order to solve such problem of output sound interruption, a system can be packaged to be composed of central IP telephone equipment serving as a telephone exchange and IP telephone terminals. This is effective means for manufacturers. Specifically, in the system, the telephone terminal has a digital signal processor (DSP) mounted thereon, and when a communication control command is issued by the IP telephone exchange to the IP telephone terminals, the communication control command notifies parameter information to form the output sound. This processing enables the IP telephone terminals to dynamically produce and output the related sound. A management table of audio files corresponding to the sound output information notified by the IP telephone exchange and all the prospective audio files must be prepared in the IP telephone terminals.

However, the ringing specifications such as frequencies and cycles of the call progress tones differ among countries and regions. Therefore, the output sound specifications have to be changed according to a country or region where the IP telephone exchange is installed. The IP telephone terminal has to restructure the audio files into an application compliant to the standard of the country or region according to the output sound specifications of the IP telephone exchange. More specifically, the IP telephone application provides an install image containing an audio file to the terminal user. Further, in some cases, the providing vendor of the IP telephone exchange is different from that of the IP telephone application. If this is the case, whenever a vendor providing the IP telephone exchange changes the specifications, a vendor providing the IP telephone application is following the change and requires to prepare a restructured install image.

Further, the IP telephone terminal has no audio files corresponding to the output sounds. Therefore, if the IP telephone exchange adds new sound output information and the IP telephone terminal receives a communication control command to output the new output sound, the IP telephone terminal is not able to output the related sound. In order to avoid such circumstances, it is known to provide preliminary sound output information so that the new audio file is provided to the IP telephone application vendor to restructure the install image. However, this method is restricted if the prepared preliminary sound output information is limited. It is in the first place impossible to solve the problem of occurrence of situation in which the IP telephone application vendor is required to restructure the install image whenever a new audio file is added.

The present invention relates to a system in which central telephone equipment having a telephone exchange function using IP is combined with telephone terminals via a network, and communication is controlled by Voice over IP (VoIP). In such a system, output sound specifications for call progress tones need be changed according to a country or region where the central telephone equipment is installed. However, the change of the output sound specifications cannot be performed easily by simple configuration. The present invention intends to solve such problems of the system.

SUMMARY OF THE INVENTION

It is an object of the present invention to provide a sound output setting system for use in information processing terminals, which has simple configuration and capable of easily causing the information processing terminal to output a desired call progress tone to be heard by the user.

In order to achieve the object the present invention provides a sound output setting system including at least one SIP server and a plurality of information processing terminals connected via a network using Session Initiation Protocol (SIP). The SIP server and the information processing terminals are each provided with a management table recording region for recording types of sounds output by the information processing terminal in association with their identification codes and an audio file storage region for recording a plurality of audio files associated with the identification codes. Each of the information processing terminals has a unit for acquiring recorded data in a corresponding region in the SIP server at a predetermined time, comparing its own recorded data with the acquired data, and updating the recorded data so as to match the same with the acquired data.

According to this configuration, a defined tone management table and audio files listed in the table are preliminarily recorded and stored in the management table recording region and the audio file storage region of the SIP server. This enables the information processing terminal to acquire the recorded data corresponding to the output sound to be used by requesting the SIP server. Further, the information processing terminal receives, at a predetermined time, audio files of output sound to be used from the SIP server and stores them. Therefore, upon receiving an output sound identification code by way of a SIP message from the SIP server prior to a talk session, the information processing terminal is able to retrieve a corresponding audio file from the audio file storage region and output the sound.

The predetermined time mentioned in the above is a time when the information processing terminal requests the SIP server for registration, or when an audio file is newly registered in the audio file storage region of the SIP server and thus the relevant management table is updated. It is preferably a time when the SIP server notifies the information processing terminal of the relevant management table and audio files. Therefore, the user of the information processing terminal is saved from the trouble to individually register desired audio files. Further, the synchronization between the SIP server and the information processing terminals can be constantly maintained by the update, which enables unified management of the output sound.

The management table is preferably provided in the SIP server in association with the plurality of the information processing terminals, and provided in each of the information processing terminals in association only with the audio file used by the information processing terminal. As a result, the output sound of the information processing terminals can be set individually.

The SIP server and the information processing terminals each have, in addition to the audio file, a text file and a multimedia file and their storage regions in correspondence with the output sound identification code. This enables the data to be visibly display with either both or at least one of a text and an image, in addition to being output as sound. Accordingly, the sound output setting system according to the present invention is suitably applicable to transmission of call progress tones in noisy environment or the like.

Further, in the sound output setting system according to the present invention, one of the plurality of the SIP servers serves as a file providing server having a plurality of audio file storage regions for storing a plurality of audio files, and the remaining SIP servers serve as tone management servers each having a management table recording region corresponding to the respective information processing terminals. The tone management server is able to retrieve an audio file corresponding to the information processing terminal from the file providing server and transmit the acquired file to the information processing terminal.

According to this configuration, the tone management servers are able to easily select an appropriate audio file based on the management table from the audio file providing server for the information processing terminals present in different environments and to transmit the selected audio file to the respective information processing terminals.

In particular, the remaining SIP servers may be connected to the information processing terminal associated therewith by means of a local area network (LAN) to form a plurality of systems, and these systems may be connected to the audio file providing server by the Internet. In this case, the setting and updating are easy since the audio file providing server is able to select an audio file of output sound corresponding to various regions or countries from a plurality of audio file storage regions and to output the selected file to the information processing terminal.

The SIP server may serve as IP key-telephone main equipment or IP private branch exchange for controlling the telephone exchange function, and the information processing terminals may serve as IP telephone terminals.

In the sound output setting system for use in information processing terminals according to the present invention, data of a management table and audio files corresponding to thereto are transferred from the SIP server at a predetermined time, for example when the information processing terminal requests the SIP server to register the data. Accordingly, the information processing terminal is able to acquire recorded data and store the data in its own storage region even if the information processing terminal has no management table or audio files corresponding thereto in the initial state. As a result, the user or system installer is saved from the trouble to upload every data to the terminal.

BRIEF DESCRIPTION OF THE DRAWINGS

FIG. 2A is an explanatory table illustrating an example of data in the tone management table of FIG. 1 (first embodiment);

FIG. 2B is an explanatory table illustrating another example of tone management table data different from that of FIG. 2A (first embodiment);

FIG. 7 is an explanatory sequence chart showing an example of operation procedures corresponding to connection procedures of the sound output setting system in FIG. 1 performed following the end of talk (first embodiment);

FIG. 8A is an explanatory table illustrating an example of tone management table data different from that of FIG. 2A or FIG. 2B, according to another embodiment of the present invention (second embodiment);

FIG. 8B is an explanatory table illustrating an example of tone management table data different from that of FIG. 2A, FIG. 2B, or FIG. 8A (second embodiment), FIG. 11 is an explanatory table showing an example of data in the tone management table in FIG. 10 (third embodiment)

DETAILED DESCRIPTION OF THE INVENTION

Figure 1:
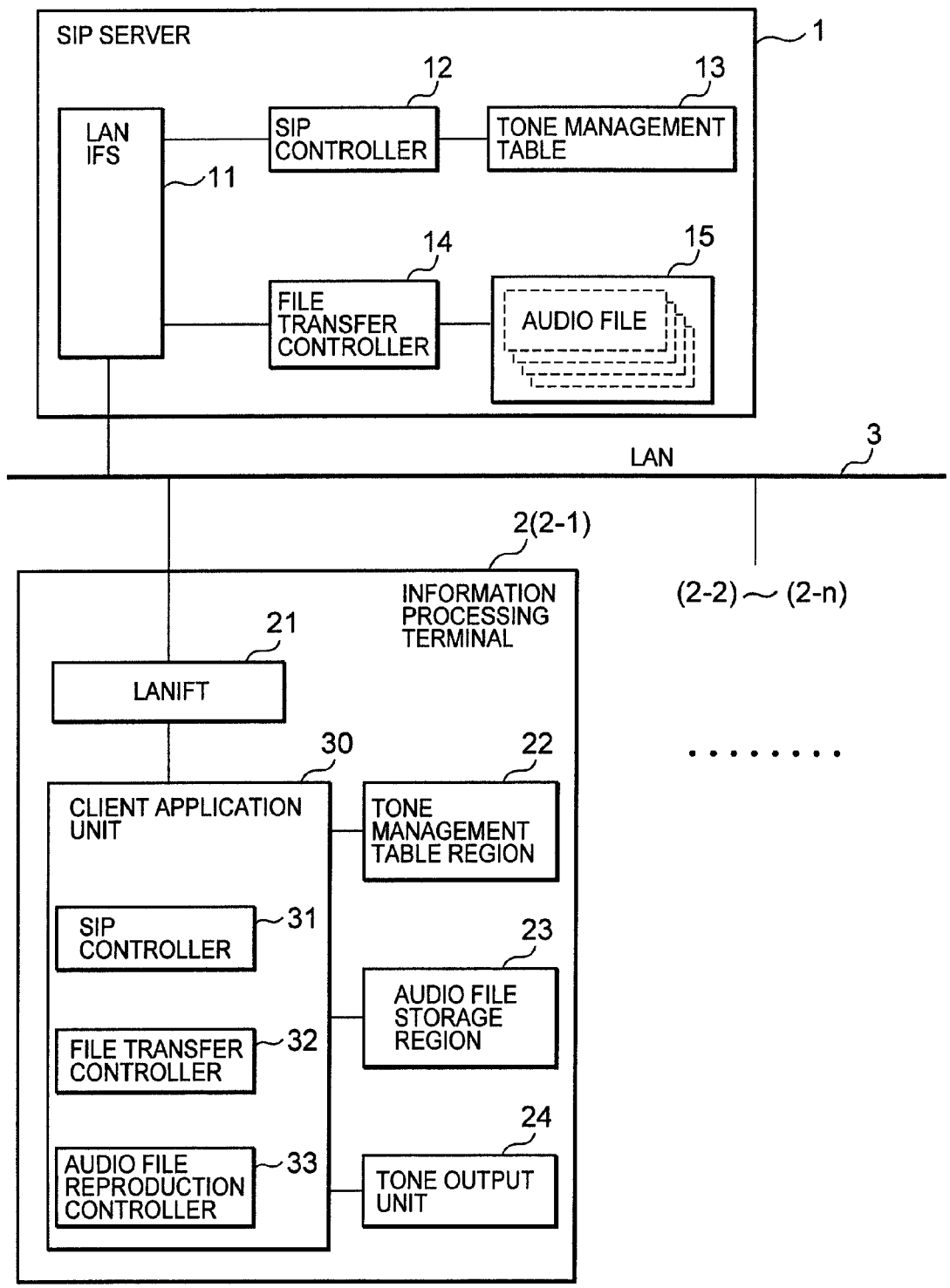
FIG. 1 is an explanatory block diagram showing a sound output setting system for use in information processing terminals according to an embodiment of the present invention (first embodiment)

The present invention will be described in detail with reference to the accompanying drawings.

An object of the present invention is to provide a sound output setting system for use in information processing terminals, having simple configuration and yet capable of easily outputting desired call progress tones from the information processing terminal to allow a user to hear the tone. The output sound setting system thus has at least one SIP server and a plurality of information processing terminals, which are connected via a network by using SIP (Session Initiation Protocol). For example, IP telephone exchange corresponds to the SIP server, and IP telephone terminals correspond to the information processing terminals, using IP (Internet Protocol) between them. The SIP server and the information processing terminals are each provided with a management table region for defining and recording correspondence relationship between types of output sounds and their identification codes, and an audio file storage region for recording a plurality of audio files corresponding to the identification codes. Upon acquiring data recorded in a corresponding region of the SIP server at a predetermined time, the information processing terminal compares its own recorded data with the acquired data and updates its own recorded data to match the same with the acquired data.

Preferred embodiments of the present invention will be described with reference to the drawings. In the drawings, some of essential functions will be omitted unless they relate to the present invention. For the convenience of description using the drawings, the table recording region on the server side will sometimes be simply referred to as the "table", and the file storage region on the server side will sometimes be simply referred to as the "file". The above-mentioned management table will be hereinafter referred to as the "tone management table". Further, a SIP client application will be shortly referred to as the only "client application". It should be understood that changes can be made freely in combination of block functions by dividing or integrating them and in sequence of steps, so far as the functions of the present invention are satisfied, and that the present invention is not limited by the following detailed description.

First Embodiment

A first embodiment of the present invention will be described with reference to FIG. 1.

FIG. 1 is an explanatory block diagram showing an embodiment of the system according to the present invention.

The sound output setting system shown in FIG. 1 is composed of a SIP server 1, a plurality of information processing terminals 2-1 to 2-$n$, and a LAN 3. The LAN 3 is for example Ethernet (registered trademark). The SIP server 1 and the information processing terminals 2-1 to 2-$n$ are connected to the LAN 3 to enable mutual communication using Session Initiation Protocol (SIP). Therefore, SIP messages are used in the control sequence.

The SIP server 1 operates as IP telephone exchange, and has a LANIFS (LAN interface for server) 11, a SIP controller 12, a tone management table 13, a file transfer controller 14, and an audio file storage region 15. The SIP server 1 serves as a proxy server for relaying SIP messages to the information processing terminals 2 and as a registration server for registering and updating tables and files.

Each of the information processing terminals 2 operates as an IP telephone terminal, and has a LANIFT (LAN Interface For Terminal) 21, a tone management table region 22, an audio file storage region 23, a tone output unit 24, and a client application unit 30. The client application unit 30 is a portion of the SIP client application, and has a SIP controller 31, a file transfer controller 32, and an audio file reproduction controller 33.

The LANIFS 11 is a LAN interface located in the server, and is connected to the LAN 3 on one side and to the SIP controller 12 and file transfer controller 14 on the other side. The SIP controller 12 is connected to the LANIFS 11 on one side and to the tone management table 13 on the other side. The SIP controller 12 operates as a proxy server for relaying SIP messages to the SIP controller 31 in the information processing terminal 2 when an output sound is transmitted. This operation will be described in detail later with reference to the related drawings.

The tone management table 13 is a management table recording region in the SIP server 1. There are recorded, in this management table recording region, management tables 13-1 and 13-2 corresponding to the information processing terminals 2-1 and 2-2, respectively. The recorded contents are for example as shown in FIGS. 2A and 2B.

Figure 3:
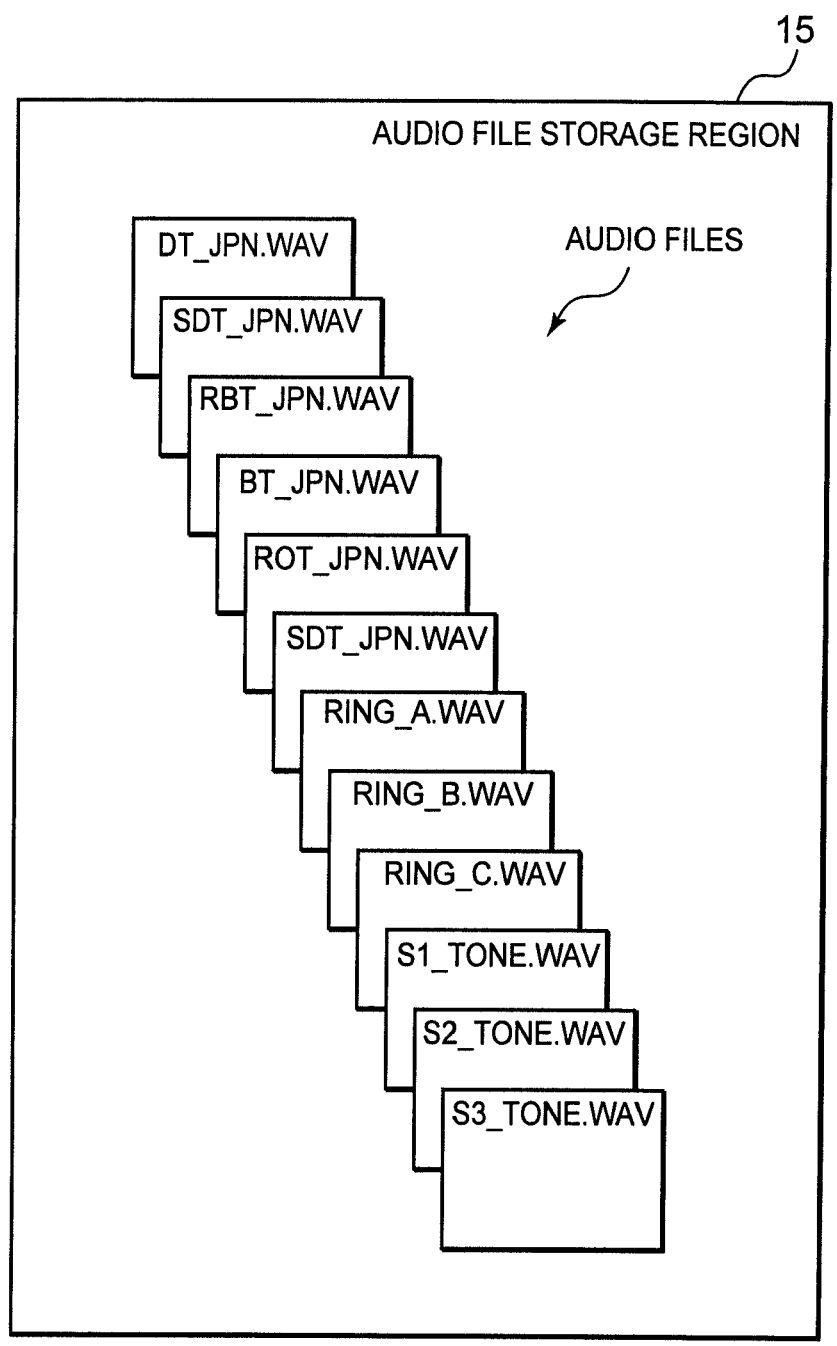
FIG. 3 is an explanatory list showing an example of the audio files in FIG. 1 (first embodiment)

The file transfer controller 14 is connected to the LANIFS 11 on one side and to the audio file storage region 15 on the other side. The file transfer controller 14 implements a file transfer session with the file transfer controller 32 of the information processing terminal 2. The file transfer session is a session in which a predetermined audio file is downloaded from the audio file storage region 15 to the information processing terminal 2. The file transfer session uses File Transfer Protocol (FTP), for example. The audio file storage region 15 is a storage region for storing audio files in the SIP server 1. There are recorded, in the audio file storage region 15, all the audio files expected to be used in the system. The recorded contents are for example as shown in FIG. 3.

The LANIFT 21 is a LAN interface disposed in each of the terminals and is connected to the LAN 3 on one side and connected to the client application unit 30 on the other side. The tone management table region 22 is a management table recording region disposed in the information processing terminals 2 and connected to the client application unit 30. Data recorded in the tone management table region 22 are acquired from the tone management table 13 in the SIP server 1. For example, a management table 13-1 shown in FIG. 2A is recorded in the information processing terminal 2-1, and a management table 13-2 shown in FIG. 2B is recorded in the information processing terminal 2-2. The audio file storage region 23 is an audio file storage region disposed in the information processing terminals 2. Audio files corresponding to the respective management tables of the information processing terminal 2-1 to 2-n are acquired from the audio file storage region 15 in the SIP server 1 for example as shown in FIG. 3 and recorded in the respective audio file storage regions 23. The tone output unit 24 is connected to the client application unit 30 so that the client application unit 30 reproduces a sound signal received from the SIP server 1 into an audible sound and outputs the audible sound.

The client application unit 30 is installed and operates on a general purpose operation system (OS) of the information processing terminals 2. The client application unit 30 operates as SIP User Agent (SIPUA), whereas the above-mentioned SIP server 1 operates as a proxy server and registration server.

The client application unit 30 controls registration to the SIP server 1. Specifically, the client application unit 30 receives transmission of registered data from the SIP server 1 upon a registered data acquisition request from the user or registration operation of the SIP server 1. Every time the registration is made, the client application unit 30 records the data registered in the SIP server 1 in its own tone management table region 22 and updates the recorded data. Whenever the tone management table 13 is updated in the SIP server 1, the client application unit 30 receives the updated data from the SIP server 1. Thus, the client application unit 30 updates the data recorded in its own tone management table region 22 by using the updated data received from the SIP server 1.

More specifically, the client application unit 30 receives a notification of data in the tone management table 13 through a SIP message from the SIP server 1. Upon the reception of the notification, the client application unit 30 updates the data information recorded in the tone management table region 22 corresponding to itself by using the notified data in the tone management table 13. In this manner, the update of the recorded data in the tone management table region 22 is carried out every time a registration request is issued and every time the tone management table 13 is updated in the SIP server 1. Therefore, the client application unit 30 is not required to possess any data in the tone management table in the initial state.

The client application unit 30 is able to share sound output information defined by the SIP server 1 and to uniquely determine the output sound by using the same tone management table. The definition of the output sound can be changed only by changing the tone management table 13 of the SIP server 1. This enables all the information processing terminals 2-1 to 2-n registered in the SIP server 1 to carry out unified management of output sounds.

Further, the client application unit 30 checks if audio files defined in the tone management table 13 are stored in the audio file storage region 23 when the data in the tone management table region 22 is updated. If there are any audio files not acquired yet, the file transfer controller 32 initiates a file transfer session with the file transfer controller 14 of the SIP server 1. The file transfer controller 32 then downloads the audio files from the SIP server 1. The difference check control performed in this case will be described later in association with description of subsequent operation. The file transfer session between the file transfer controller 32 and the file transfer controller 14 is implemented for example by File Transfer Protocol (FTP).

Since required audio files are downloaded every time the tone management table 13 is updated, the client application unit 30 is not required to preliminarily possess audio files of output sounds. The change of the audio files also can be done only by changing the audio files in the SIP server 1. This enables all the information processing terminals 2-1 to 2-n registered in the SIP server 1 to carry out unified management of output sounds.

Subsequently, during the transmission of the output sound, as described above, the SIP controller 12 of the SIP server 1 operates as a proxy server for relaying the SIP messages to the SIP controller 31. The SIP controller 12 interprets the SIP message to be relayed, and if the output of sound is required, the SIP controller 12 instructs the SIP controller 31 to transmit the output sound by means of the SIP message. This instruction contains, as a parameter, a tone ID (identifier) defined as an output sound identifier in the tone management table 13. Upon receiving the instruction, the SIP controller 31 identifies an audio file corresponding to the notified tone ID from the tone management table region 22. The SIP controller 31 then instructs the audio reproduction controller 33 to reproduce the audio file. In response to the instruction, the audio reproduction controller 33 drives the tone output unit 24 so that the sound designated by the SIP server 1 is output.

The client application unit 30 also notifies the SIP controller 12 in the SIP server 1 of a terminal operation event not directly related to the communication session as well. When determining that a tone output instruction is required for the event thus notified, the SIP server 1 issues a tone output instruction to the SIP controller 31 from the SIP controller 12. Accordingly, in the same manner as described above, the audio reproduction controller 33 drives the tone output unit 24 in response to the instruction from the SIP controller 31 so that the sound designated by the SIP server 1 is output.

Figure 6A:
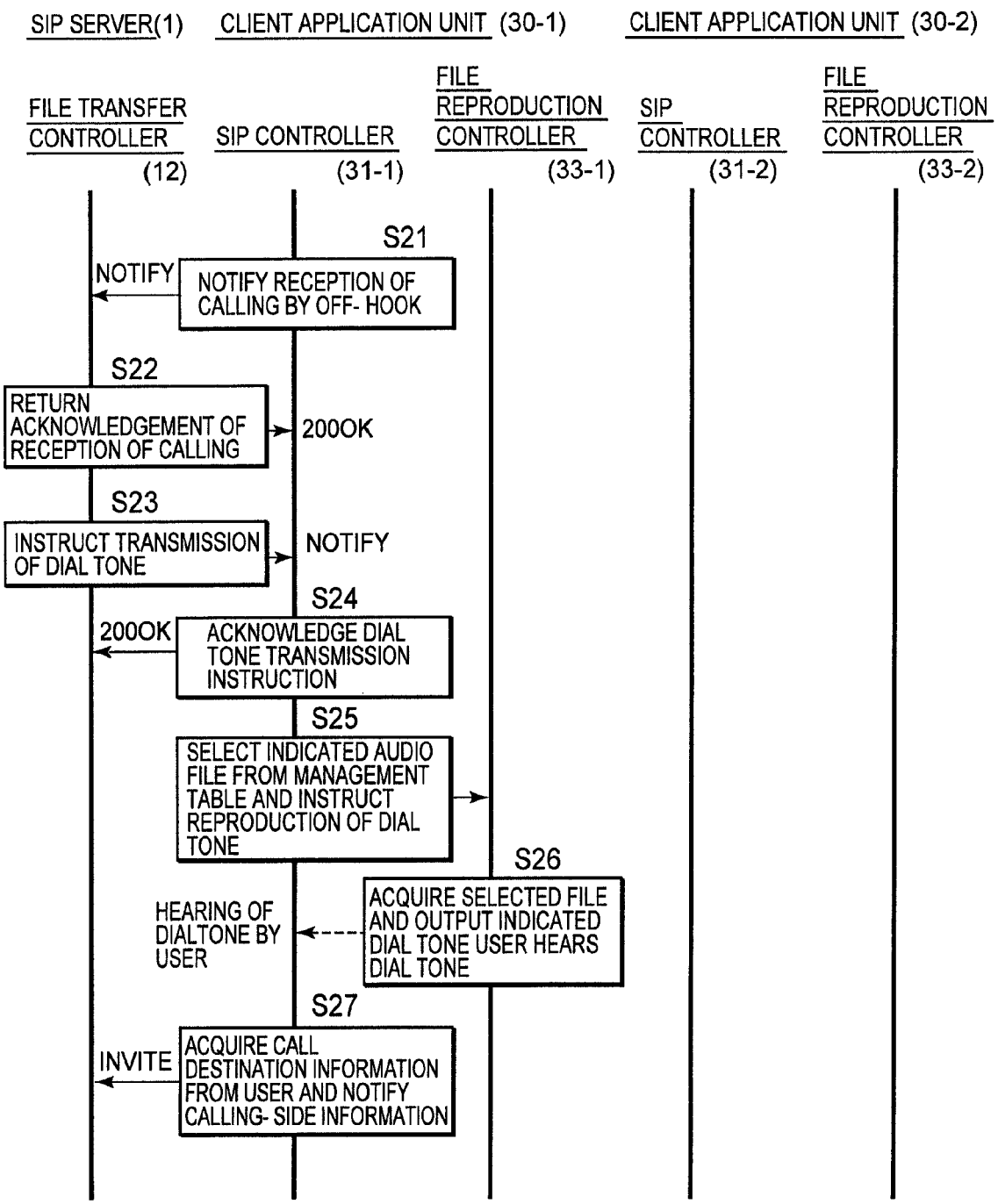
FIG. 6A is an explanatory sequence chart showing an example of operation procedures corresponding to calling procedures of the sound output setting system in FIG. 1 until a dial tone is heard (first embodiment)

A specific example of this operation will be described later with reference to FIG. 6A as procedure steps up to the "output of the dial tone" when the telephone terminal is hooked off.

The management tables 13-1 and 13-2 will be described with reference to FIGS. 2A and 2B, respectively. The management table 13-1 shown in FIG. 2A is associated, for example, with the information processing terminal 2-1. The management table 13-2 shown in FIG. 2B is associated, for example, with the information processing terminal 2-2.

The tables are configured to make definition by associating the audio files with the identifiers (tone IDs) assigned to the types of output sounds (types of tones) in the terminals. The tone types include, for example, dial tones (DT), special dial tones (SDT), ring-back tones (RBT), busy tones (BT), ringing signals or ringing tones (RING), and special tones (S-TONE). The ringing tones (RING) and special tones (S-TONE) are associated with a plurality of different output sounds. The audio files shown in these drawings are indicated as WAV (wave files) using format of the standard audio file of Windows (registered trademark). Nevertheless, the audio files may take any format so far as it can be reproduced by the audio file reproduction controller 33 of the information processing terminal 2 and can be output as audio by the tone output unit 24.

FIG. 3 shows an example of a list of audio files stored in the audio file storage region 15 of the SIP server 1. The audio files contained in the management tables 13-1 and 13-2 are selected from the files in the audio file storage region 15. When a new type of output sound is added to the tone management table 13, an audio file corresponding to the added new type is added to the audio file storage region 15. On this occasion, the pertinent registration is updated in the tone management table region 22 and the audio file storage region 23 of the related information processing terminal 2.

When the registration in the related information processing terminal 2 is to be updated, the client application unit 30 checks in the first place if the audio files defined by the tone management table 13 in the SIP server 1 are stored in the table in the tone management table region 22. If there are any unacquired audio files, the client application unit 30 initiates a file transfer session with the file transfer controller 14 of the SIP server 1 by means of the file transfer controller 32. The file transfer controller 32 then downloads the necessary audio files from the SIP server 1.

Figure 4:
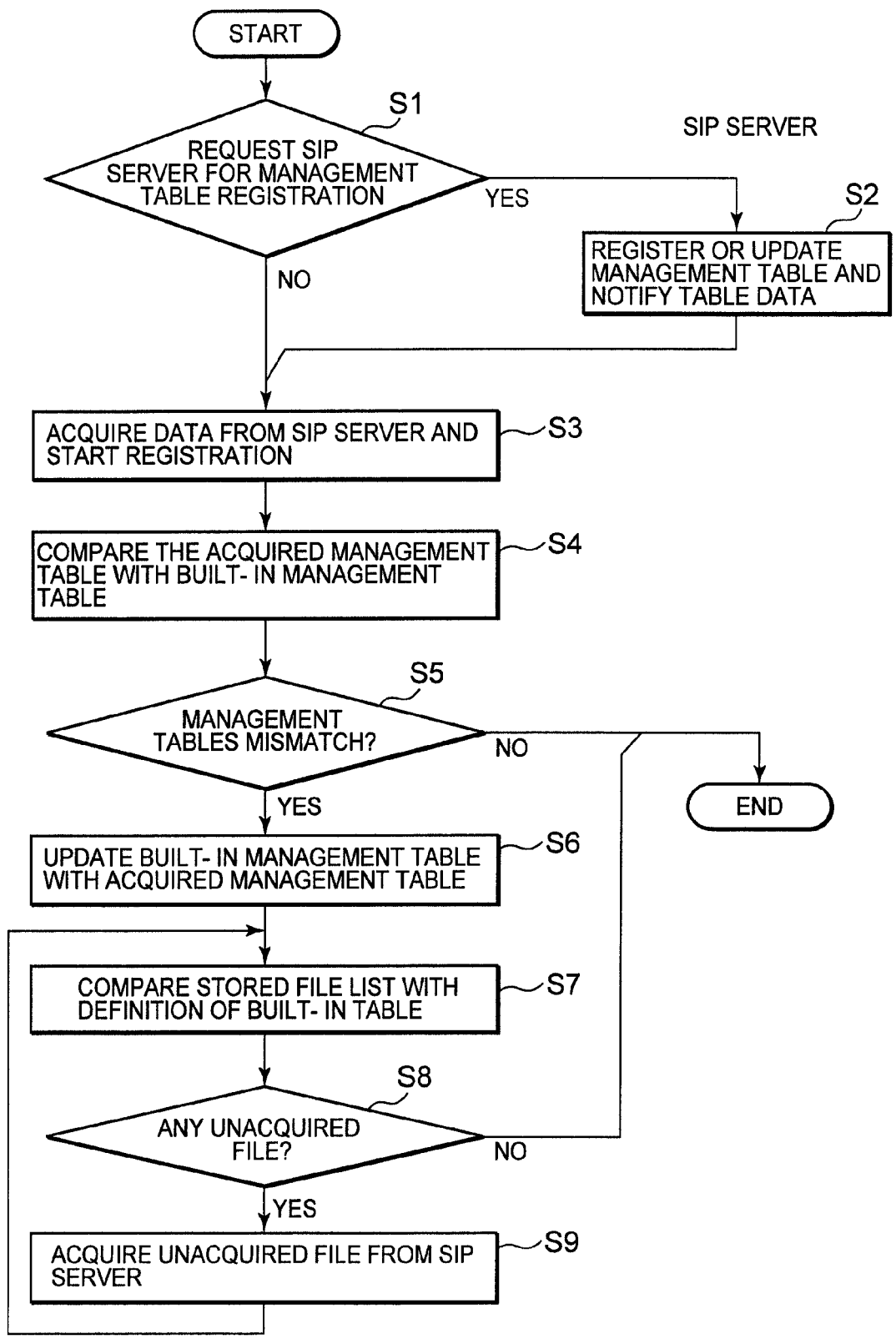
FIG. 4 is an explanatory flowchart showing an example of principal operation procedures of the client application unit in FIG. 1 (first embodiment)

Description will be made using the flowchart of FIG. 4 in conjunction with the block diagram of FIG. 1. The following description will contain specific operation procedures for registration and update of registration in the tone management table region 22 and audio file storage region 23 in the information processing terminals 2.

When a first registration is to be made in an information processing terminal 2, the client application unit 30 receives a registration request at the SIP controller 31 from the system installer or the user. Receiving the request, the client application unit 30 requests registration of table data to a management table to the SIP server 1 (YES in step S1). Upon receiving the request, the SIP controller 12 in the SIP server 1 registers the table data in the tone management table 13. AT the same time, the SIP controller 12 notifies the information processing terminal 2 of the registered table data as the latest management data (step S2).

On the other hand, separately from the registration request from the client application unit 30, the SIP server 1 is able to automatically make registration and update the registration in the tone management table 13 or the audio file storage region 23. Like the step S2 described above, it is the SIP controller 12 that makes registration and updates the registration in the tone management table 13. The SIP server 1 then notifies the pertinent information processing terminal 2 of the registered table data as its latest management data.

Even if the registration of a management table is not requested in step S1 above (NO in step S1), the SIP controller 31 in the client application unit 30 initiates control of registration if acquiring the latest table data information from the SIP server 1 in step S2 above or in an equivalent of the step S2 (step S3). Specifically, the SIP controller 31 compares the acquired table data with data in the tone management table region 22 (step S4). If the data do not mismatch each other (NO in step S5), the procedure is terminated.

If the data mismatch each other (YES in step S5), the SIP controller 31 updates the data in the tone management table region 22 with the acquired data (step S6). The SIP controller 31 compares the file list stored in the audio file storage region 23 with the definition of the update table in the tone management table region 22. If the comparison determines that there is no unacquired file (NO in step S8), the procedure is terminated. However, if there is any unacquired file (YES in step S8), the SIP controller 31 acquires the unacquired file by requesting the file transfer controller 14 of the SIP server 1 (step S9), and the procedure returns to step S7 to check the recorded data in the table again.

Procedures for downloading the audio files will be described by using the sequence chart of FIG. 5 in conjunction with the block diagram of FIG. 1. These procedures correspond to the control procedures conducted after the user of the information processing terminal 2 has activated the client application unit 30 to establish a predetermined operable condition by log-in or log-on. The procedures continue until data in the tone management table 13 and predetermined audio files in the audio file storage region 15 are acquired from the SIP server 1. It is assumed here that the SIP messages are conveyed between the function blocks through the LAN 3.

When the user has activated the client application unit 30 to establish a predetermined operable condition, the SIP controller 31 transmits a REGISTER message to request registration to the SIP controller 12 of the SIP server 1 (step S11). This message contains as its parameters, for example, information to identify the user of the information processing terminal 2-1, and information indicating that the SIP user agent of the information processing terminal 2-1 is the client application unit 30. The SIP controller 12 stores the fact that the "user A" has utilized the client application unit 30 to render the system operable. The SIP controller 12 then returns a 200 OK message to the SIP controller 31 as a response to acknowledge normal reception of the REGISTER message (step S12).

Accordingly, upon receiving the 200 OK message, the SIP controller 31 transmits a SUBSCRIBE message to the SIP controller 12. The SUBSCRIBE message requests notification of terminal information required for the information processing terminal to operate as a system terminal (step S13). Specifically, acquisition of data in the tone management table 13 is requested by a parameter in this message.

The SIP controller 12 notifies normal reception of the SUBSCRIBE message by returning a 200 OK message. On the other hand, the SIP controller 12 reads relevant management table data from the tone management table 13. The read data is transmitted to the source of the request, that is, the SIP controller 31 by mans of a parameter in a NOTIFY message (step S14).

The SIP controller 31 notifies normal reception of the NOTIFY message by returning a 200 OK message. At the same time, the SIP controller 31 updates the table data in the tone management table region 22 with the use of the acquired data. The tone management table data as a parameter in this NOTIFY message can be notified as data that has been structured with the use of a message summary format using Extensible Markup Language (XML). Therefore, the data in the tone management table region 22 can be updated easily.

Subsequently, the SIP controller 31 examines if the audio files in the updated management table are stored in the audio file storage region 23. If the audio file storage region 23 lacks any audio files, the file transfer controller 32 is instructed to acquire the audio files in the same manner as the initial registration (step S15). Upon receiving the audio file acquisition instruction, the file transfer controller 32 prepares for receiving the download. Upon completion of the preparation, the file transfer controller 32 requests the file transfer controller 14 of the SIP server 1 to initiate a file transfer session (step S16). The file transfer session is thus established, and the audio files are downloaded from the audio file storage region 15 in the SIP server 1 to the audio file storage region 23 (step S17). When the file download has been completed and the files have been recorded and stored in the audio file storage region 23, the file transfer controller 32 terminates the file transfer session. At the same time, the file transfer controller 32 notifies the file transfer controller 14 of the termination of the file transfer session (step S18).

Figure 6B:
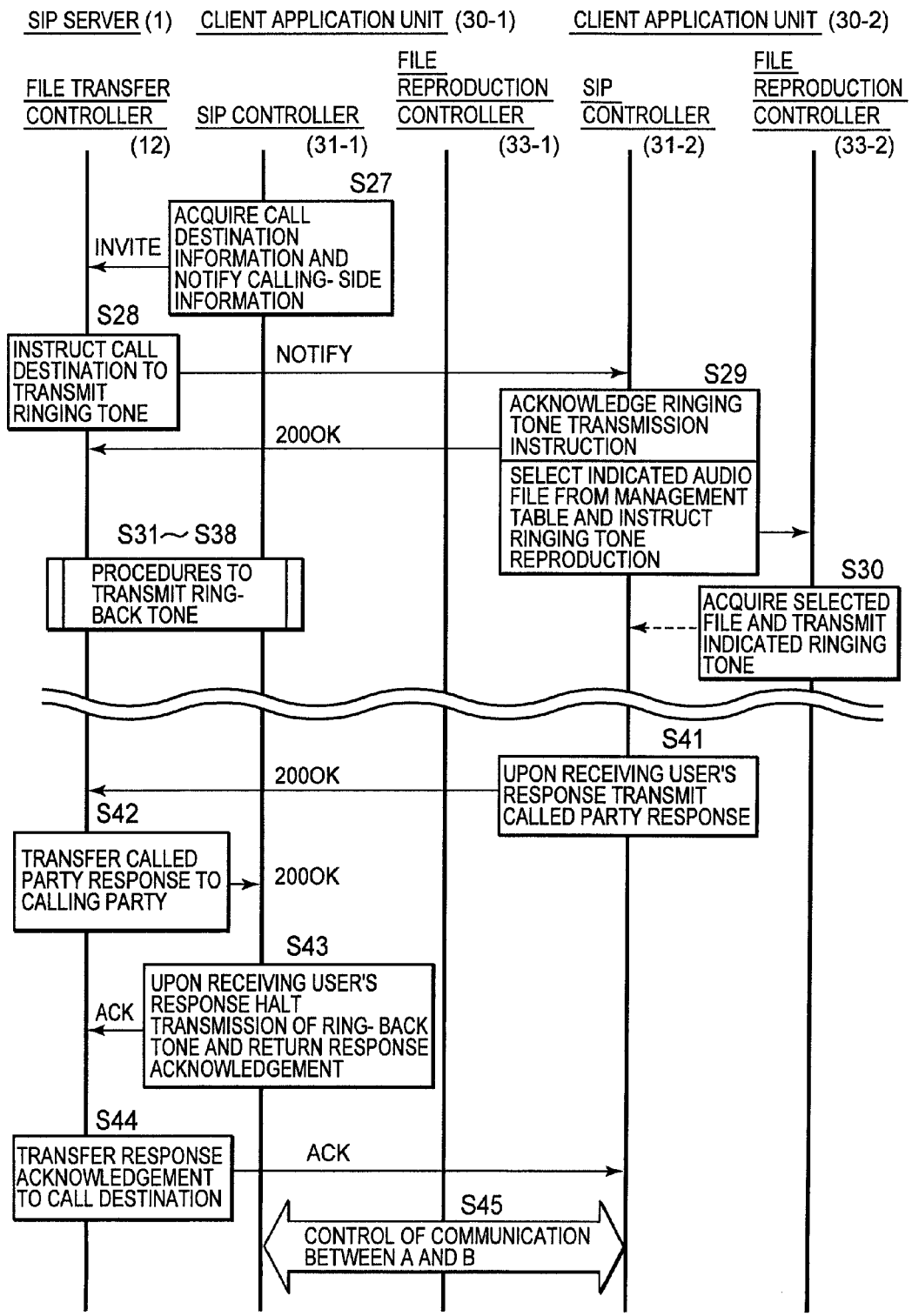
FIG. 6B is an explanatory sequence chart continued from FIG. 6A, showing an example of operation procedures corresponding to connection procedures of the sound output setting system until the called party responds (first embodiment)
Figure 6C:
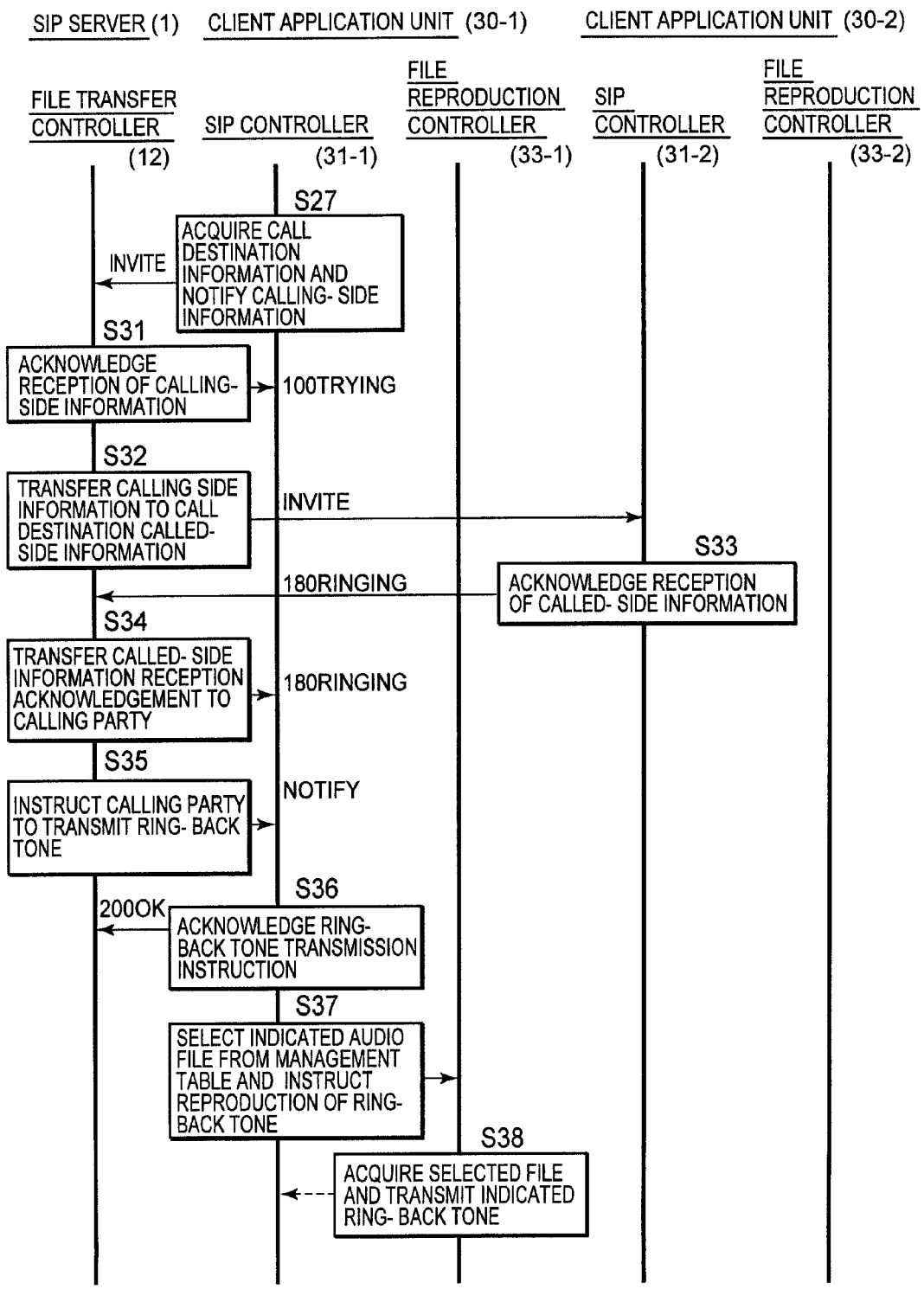
FIG. 6C is an explanatory sequence chart showing an example of operation procedures corresponding to the connection procedures of the sound output setting system in the middle of FIG. 6B until the calling party hears a ring-back tone (first embodiment)

Procedure steps until a telephone conversation is initiated will be described by using the sequence charts in FIGS. 6A to 6C in conjunction with the block diagram in FIG. 1, and FIG. 2 and FIG. 3. The description contains a step in which the information processing terminal 2-1 originates a call and the information processing terminal 2-2 responds to the call. The information processing terminal 2-1 includes, as its components, a client application unit 30-1, a SIP controller 31-1, and an audio file reproduction controller 33-1. Likewise, the information processing terminal 2-2 includes, as its components, a client application unit 30-2, a SIP controller 31-2, and an audio file reproduction controller 33-2.

Upon the user of the information processing terminal 2-1 I performing off-hook of a handset or the like, the SIP controller 31-1 notifies the SIP controller 12 in the SIP server 1 of "reception of call" (step S21). This notification is performed by means of a NOTIFY message. The NOTIFY message contains, as its parameter, the detection of the user's off-hook operation by the utilization portion 30-1. Upon receiving the notification, the SIP controller 12 returns to the SIP controller 31-1 a "call reception acknowledgement" indicating that the NOTIFY message has been received normally (step S22). This returned message is a 200 OK message, in which the "call reception acknowledgement" is contained. Further, the SIP controller 12 transmits a dial tone transmission instruction to the SIP controller 31-1 so that the user hears a dial tone (DT) (step S23). The dial tone transmission instruction is notified by means of a NOTIFY message, which contains, as its parameter, a tone ID corresponding to the type of output sound DT defined as tone output instruction in the management table 13-1. The user as "user A" keeps the information processing terminal 2-1 in operable condition. Accordingly, the tone ID "1" corresponding to the tone type "DT" read from the management table 13-1 shown in FIG. 2A is notified as a parameter of the NOTIFY message.

Upon receiving the NOTIFY message in step S23 described above, the SIP controller 31-1 returns to the SIP controller 12 a 200 OK message as dial tone transmission acknowledgement indicating the normal reception thereof (step S24). On the other hand, the NOTIFY message received by the SIP controller 31-1 contains a tone output instruction as a parameter. According to this instruction, the SIP controller 31-1 performs selection processing to determine an audio file corresponding to the instructed output sound from the acquired audio files based on the management table 13-1. Specifically, the SIP controller 31-1 refers to the tone management table region 22-1 according to the tone ID "1" and acquires an audio file corresponding thereto. When the definition is made as the management table 13-1, the audio file corresponding to the tone ID "1" is "DT_JPN.WAV". Accordingly, the SIP controller 31-1 issues an audio file reproduction instruction to the audio file reproduction controller 33-1 to request reproduction of "DT_JPN.WAV" (step S25).

The audio file reproduction controller 33-1 selects and acquires the downloaded audio file "DT_JPN.WAV" from the audio file storage region 23. The audio file reproduction controller 33-1 then outputs the dial tone sound to the tone output unit 24-1, which outputs the reproduced sound (step S26). In the tone output unit 91 is a handset, the user is allowed to hear the dial tones from the earpiece of the handset.

Upon hearing the dial tones, the user calls a called party by dialing a dial number. Specifically, the SIP controller 31-1 acquires call destination information containing the dial number of the called party from the user, forms the call destination information to calling-side information and notifies the calling information to the SIP controller 12 (step S27). The calling-side information is notified by means of an INVITE message. If the SIP controller 31-1 has received the call destination information such as a destination dial number when originating the call, the SIP controller 31-1 is able to automatically notify the call destination information to the SIP controller 12 upon receiving the dial tones. The SIP controller 12 operates as a proxy server for this INVITE message. Accordingly, the SIP controller 12 relays the INVITE message to the SIP controller 31-2 of the client application unit 30-2 in the information processing terminal 2-2 of the called party.

More specifically, in order to cause the user of the information processing terminal 2-2 to hear the ringing tone generating by means of a ringing signal source (ringer), the SIP server 1 issues a ringing tone transmission instruction which is transmitted from the SIP controller 12 (step S28). The ringing tone transmission instruction is notified to the SIP controller 31-2 by means of a NOTIFY message. The NOTIFY message contains, as its parameter, a tone ID as a tone output instruction. The tone ID corresponds to the ringing tone "RING" set and defined in the tone management table 13. If the definition is made for the information processing terminal 2-2 as shown in the management table 13-2, the user of the information processing terminal 2-2 is in an operable state as "user B". Accordingly, in case the ringing tone is set as "RING-B", the tone ID "7" is notified as the parameter corresponding to "RING-B".

Upon receiving the NOTIFY message, the SIP controller 31-2 returns a notification indicating normal reception of the message to the SIP controller 12. The notification of the normal reception is contained in a 200 OK message as ringing tone transmission acknowledgement. On the other hand, the NOTIFY message received by the SIP controller 31-2 contains a tone output instruction as a parameter. According to this instruction, the SIP controller 31-2 performs selection processing to determine an audio file corresponding to the indicated output sound from the acquired audio files based on the management table 13-2. Specifically, the SIP controller 31-2 refers to the tone management table region 22-2 according to the tone ID "1" to acquire a corresponding audio file. In case the definition is made as the management table 13-2, the audio file corresponding to the tone ID "7" is "RING_B.WAV". Therefore, the SIP controller 31-2 issues an audio file reproduction instruction to the audio file reproduction controller 33-2 to request reproduction of the "RING_B.WAV" (step S29).

Accordingly, the audio file reproduction controller 33-2 selects and acquires the downloaded audio file "RING_B-.WAV" from the audio file storage region 23-2. The audio file reproduction controller 33-2 then outputs the dial tone sound to the tone output unit 24-2, which outputs the reproduced sound (step S30). In case the tone output unit 24-2 is a speaker, the user is allowed to hear the ringing tone from the speaker. The ringing tone may be a bell ringing sound depending on the type of tone "RING".

On the other hand, upon receiving the INVITE message in step S27 as described above, the SIP controller 12 sends notification to the SIP controller 31-1 to acknowledge the reception of the calling-side information (step S31). The calling-side information reception acknowledgement is transmitted by being contained in a 100 TRYING message. Further, the SIP controller 12 operates also as a proxy server. The SIP controller 12 transfers the calling-side information in the INVITE message received in step S27 above to the SIP controller 31-2 as called-side information (step S32). In response to the INVITE message, the SIP controller 31-2 returns a 180 RINGING message to the SIP controller 12 (step S33). The SIP controller 12 operating as a proxy server transfers the 180 RINGING message to the SIP controller 31-1 (step S34).

At the same time, the SIP server 1 causes the calling user of the information processing terminal 2-1 to hear a ring-back tone (RBT). For this purpose, the SIP server 1 transmits a ring-back tone transmission instruction from the SIP controller 12 to the SIP controller 31-1 (step S35). The ring-back tone transmission instruction is transmitted by being contained in a NOTIFY message. A tone ID corresponding to the ring-back tone defined in the tone management table 13 is contained in parameters of the NOTIFY message as a tone output instruction. If the definition is made in the information processing terminal of the "user A" as shown in the management table 13-1, the tone ID "3" is notified as the parameter corresponding to the ring-back tone.

Upon receiving the NOTIFY message, the SIP controller 31-1 returns a ring-back tone transmission instruction acknowledgement indicating the normal reception thereof to the SIP controller 12 (step S36). The ring-back tone transmission instruction acknowledgement is transmitted by being contained in a 200 OK message. On the other hand, a tone output instruction is contained as a parameter in the NOTIFY message received by the SIP controller 31-1. According to this instruction, the SIP controller 31-1 performs selection processing to determine an audio file corresponding to the indicated output sound from the acquired audio files based on the management table 13-1. Specifically, since the tone ID is "3", the SIP controller 31-1 selects the audio file "RBT_JPN.WAV" corresponding to the tone ID "3", referring to the tone management table region 23-1. The SIP controller 31-1 issues an audio file reproduction instruction to the audio file reproduction controller 33-1 to request reproduction of the audio file "RBT_JPN.WAV" (step S37).

The audio file reproduction controller 33-1 selects and acquires the audio file "RBT_JPN.WAV" from the downloaded audio files in the audio file storage region 23-1. The audio file reproduction controller 33-1 then performs output processing of a ring-back tone sound to output the reproduced sound from the tone output unit 24-1 (step S38). If the tone output unit 24-1 is a handset earpiece, the user is allowed to hear the ring-back tone from the earpiece.

Hearing the ringing tone, the called user makes a response for example by off-hook. Upon receiving the response from the called user, the SIP controller 31-2 transmits a 200 OK message to the SIP controller 12 of the SIP server 1 (step S41). The SIP controller 12, operating as a proxy server, transfers the 200 OK message to the SIP controller 31-1 (step S42). Upon receiving the 200 OK message, the SIP controller 31-1 halts the transmission of the ring-back tone, and returns an ACK message indicating reception acknowledgement to the SIP controller 12 as a response (step S43). The SIP controller 12 operating as a proxy server transfers the ACK message to the SIP controller 31-2 of the call destination terminal (step S44). Thus, a media session is established between the SIP controllers 31-1 and 31-2, enabling the communication control (step S45). This means that the users of the information processing terminals 2-1 and 2-2 are allowed to initiate conversation with each other.

Description will be made of procedure steps after the communication has been initiated in the procedures shown in FIG. 6 and until the conversation is terminated to release the speech path, by using the sequence chart in FIG. 7 in conjunction with the block diagram of FIG. 1, and FIGS. 2 and 3. The information processing terminal 2-1 and the information processing terminal 2-2 are initially in the sate in which the users are engaged in conversation according to the procedure steps shown in FIG. 6.

The calling user of the information processing terminal 2-1 performs operation to terminate the conversation for example by on-hooking the handset. In order to terminate the media session, the client application unit 30-1 notifies reception of disconnection from the SIP controller 31-1 to the SIP controller 12 of the SIP server 1 (step S51). The notification of reception of disconnection is executed by transmitting a BYE message. The SIP controller 12, operating as a proxy server, transfers the BYE message to the SIP controller 31-2 of the client application unit 30-2 (step S52).

Simultaneously, the SIP server 1 causes the called user of the information processing terminal 2-2 to hear the busy tone (BT). The SIP controller 12 transfers the NOTIFY message to the SIP controller 31-2 (step S53). A tone ID corresponding to the types of output sound "BT" defined in the tone management table is contained in a parameter of the message as a tone output instruction. According to this instruction, the tone ID "4" corresponding to the types of output sound "BT" is notified from the management table 13-2 of the "use B" as a parameter.

Upon receiving the BYE message, the SIP controller 31-2 returns a 200 OK message to the SIP controller 12 to acknowledge the normal reception of the busy tone transmission instruction (step S54). This means termination of the media session. Further, the SIP controller 31-2 learns of the tone output instruction from the received NOTIFY message parameter. Accordingly, the SIP controller 31-2 determines an audio file corresponding to the indicated output sound from the acquired audio files based on the management table 13-2. Specifically, when the tone ID is "4", the SIP controller 31-2 refers to the tone management table region 22-2 and selects the audio file "BT_JPN.WAV" as the audio file corresponding to the tone ID "4". The SIP controller 31-2 issues an audio file reproduction instruction to the audio file reproduction controller 33-2 (step S55) to request reproduction of the audio file "BT_JPN.WAV".

The audio file reproduction controller 33-2 selectively acquires the downloaded audio file "BT_JPN.WAV" from the audio file storage region 23-2. The audio file reproduction controller 33-2 then performs busy tone sound output processing to transmit the reproduced busy tone sound from the tone output unit 24-2 (step S56). If the tone output unit 24-2 is a handset earpiece, the user hears the busy tone from the earpiece. In this manner, the called user is allowed to recognize that the call is terminated (on-hook) by the calling user.

Detecting the on-hook by the called user, the SIP controller 31-2 notifies reception of release to the SIP controller 12 (step S57). The reception of release is transmitted by means of a 200 OK message. Receiving the 200 OK message, the SIP controller 12, operating as a proxy server, transfers the 200 OK message to the SIP controller 31-1 of the calling terminal (step S58) and terminates the procedure.

The description above has been made on the tone output control according to the present invention. Therefore, description is omitted of the control to stop the output tone. The stop of the tone output can be controlled in the same manner as in the sequence description of the dial tone transmission. Specifically, the client application unit 30 notifies an operation event from the SIP controllers 31-1 and 31-2 to the SIP controller 12 of the SIP server 1. As a result, the client application unit 30 receives a tone output stop instruction by means of a NOTIFY message from the SIP controller 12, and subsequently issues an audio file reproduction stop instruction to the audio file reproduction controllers 33-1 and 33-2. Alternatively, the SIP controllers 31-1 and 31-2 of the client application unit 30 may determine that the tone transmission has been halted based on change in their own condition, and may then issue a tone transmission stop instruction to the audio file reproduction controllers 33-1 and 33-2.

The description above has been made on the assumption that the two information processing terminals 2-1 and 2-2 use different management tables 13-1 and 13-2, respectively. However, the tables can be unified to a single table to help simplification of the system configuration. For example, output sounds may be defined in a unified standard management table when installing the system. The system installer stores a same tone management table and same audio files in all the information processing terminals. When the system is operated in practice, the registration in the tone management table is changed to change the definition of the output sounds. This change can be carried out easily as described above. Accordingly, the user is allowed to change and update the registration in the management table himself, by preliminarily preparing various types of audio files in the SIP server. This means that the flexibility of the change in output sounds can be improved.

Further, the description above has been made principally in terms of an example of transmission of output sound in the course of connection. However, the SIP controller of the SIP server is sometimes notified by the SIP controller in an information processing terminal of usage of a specific service in the SIP client application. It is also possible in this case to obtain a system-specific service tone from the audio file reproduction controller by way of a NOTIFY message including a tone output instruction from the SIP controller. This means that an audio file defined in the tone management table can be reproduced and the tone thereof can be output from the tone output unit.

In case the information processing terminals are IP telephone terminals and the SIP server is an IP telephone exchange, the configuration as described above makes it possible for the IP telephone exchange in a private branch exchange network to unify the management of output sound transmitted by the IP telephone terminals. This is because when the tone definition is changed in the IP telephone exchange during the registration control being performed on the IP telephone exchange, the IP telephone terminals acquire from the IP telephone exchange data in the tone management table. Accordingly, each of the IP telephone terminals is able to update the tone management table and audio files stored in the IP telephone terminal. This makes it possible to maintain synchronization of the tone definition between the IP telephone exchanger and the IP telephone terminals.

Further, the each of IP telephone terminals is only required to prepare a table to define output sounds and a region to store audio files to be used. On the other hand, the data is possessed by the single IP telephone exchange so that an IP telephone terminal acquires and holds the data on the request basis. Accordingly, this provides an advantage that the user or the system installer are allowed to install the data easily.

Second Embodiment

Figure 9:
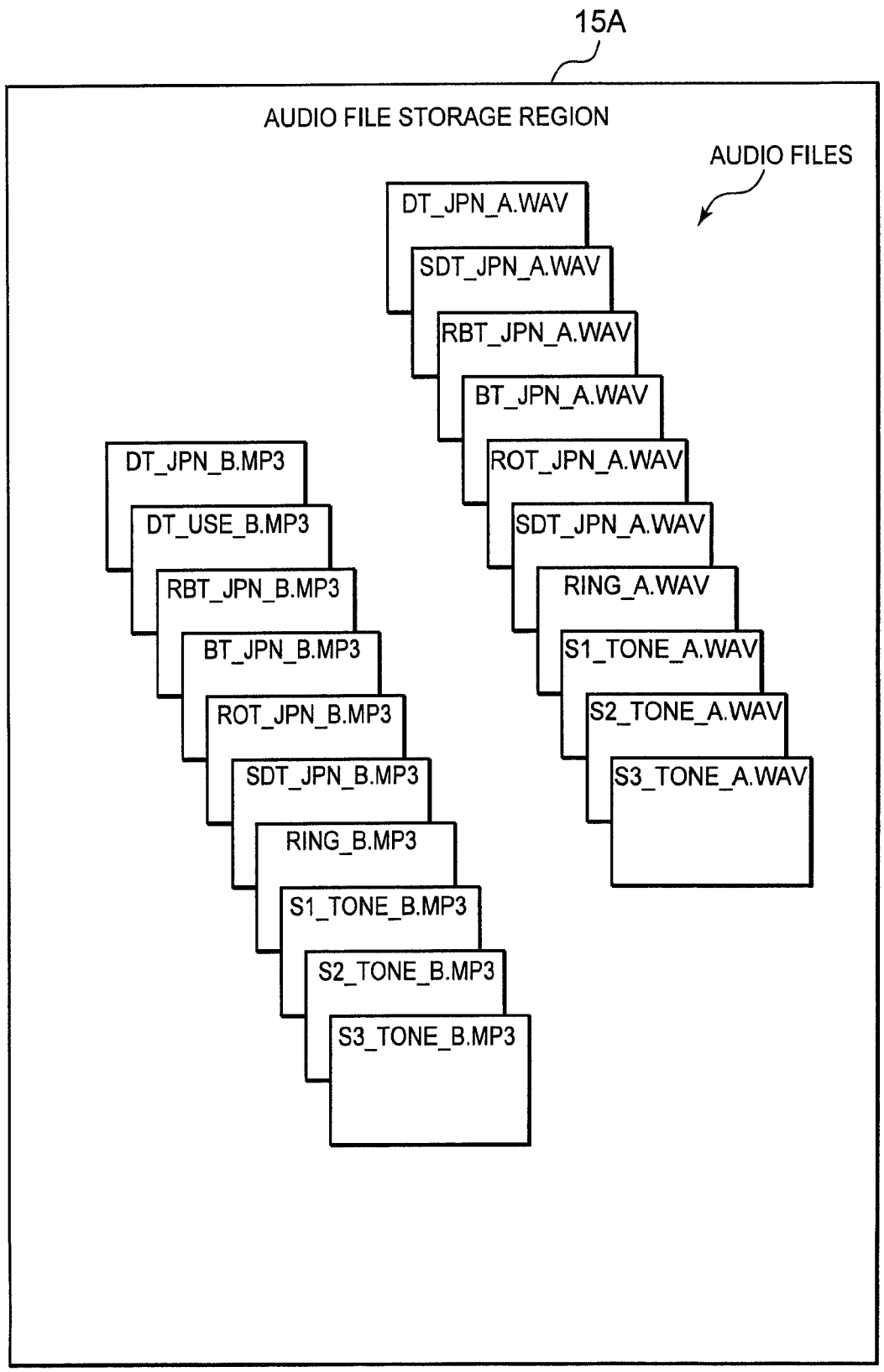
FIG. 9 is an explanatory list showing an example of audio files corresponding to the tone management tables shown in FIGS. 8A and 8B (second embodiment)

A second embodiment of the present invention will be described with reference to FIGS. 8A and 8B and FIG. 9.

In the management table according to the first embodiment described above, the audio files are unified to the WAV (wave file) of the standard audio file format for Windows (registered trademark). According to the second embodiment, however, the audio files are formatted according to the types of information processing terminals.

FIG. 8A shows a management table in which audio files unified to the WAV for telephone terminals are defined. FIG. 8B shows a management table in which audio files formatted as MP3 and compressed by a video data compression method are defined. The audio file of MP3 makes it possible to display on a personal computer screen the process of connecting a call. As shown in association with the tone ID "2" in FIG. 8B, the audio files may include those of a US type of tones "SDT_USA_B.MP3". As shown in FIG. 9, these files are stored in the audio file storage region 15A.

Designation of a tone type "MP3" is contained in terminal information in a SUBSCRIBE message. The SUBSCRIBE message is transmitted from a message processing terminal in step S13 described above upon a request for registration in the tone management table. The message processing terminal is above to acquire the MP3 designated audio file from the SIP server according to a NOTIFY message based on the SUBSCRIBE message.

This configuration makes it possible to cause different types of terminals to output different types of tones even if the tone output instructions are identical. This is also effective to solve the problem encountered for example by the audio file reproduction controller shown in FIG. 1 when supporting reproduction of audio file of different formats. Further, it is also effective to solve the problem encountered when the audio file storage region does not have a sufficient storage area for storing audio files and thus audio files of a highly compressed sound type format are used.

Third Embodiment

Figure 12:
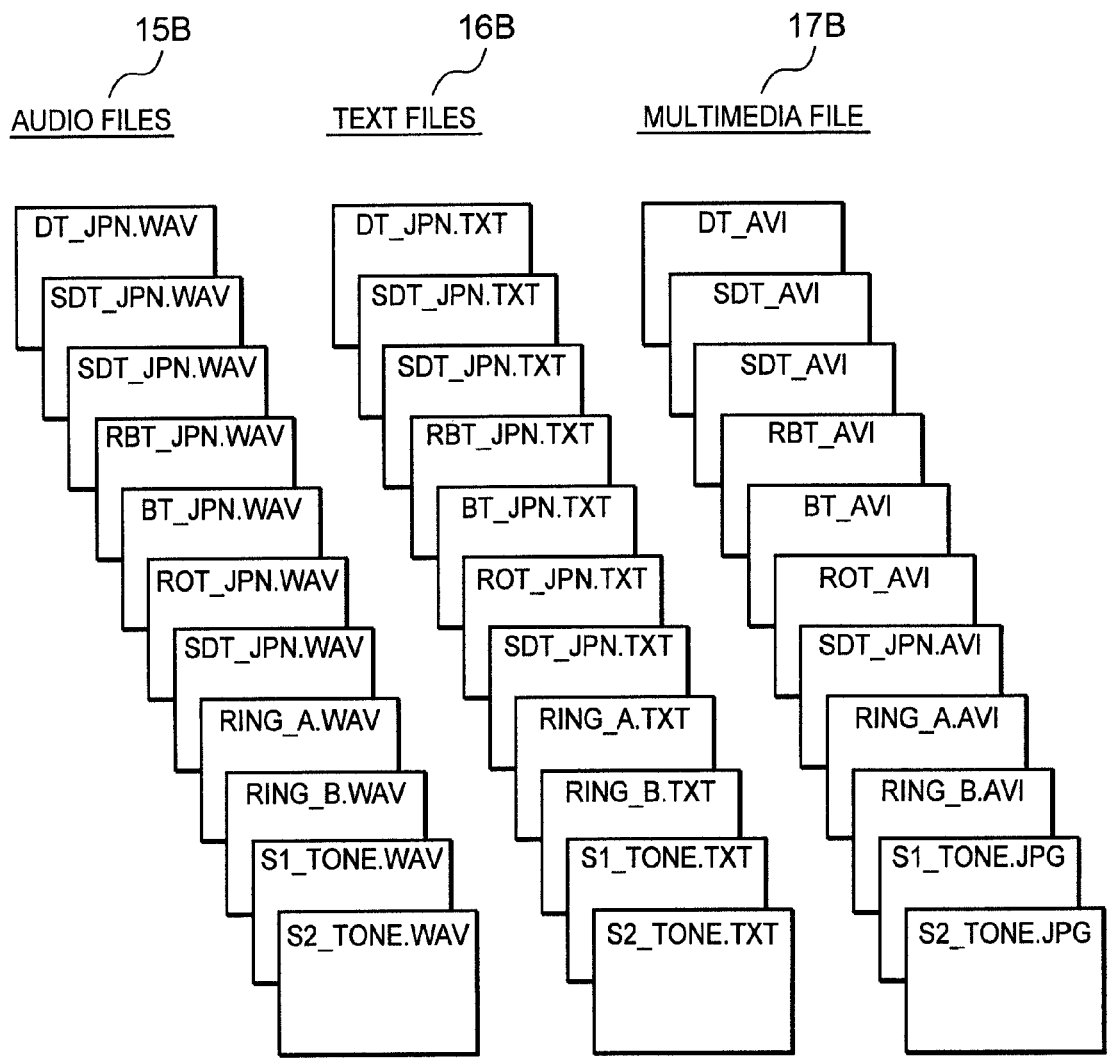
FIG. 12 is an explanatory list showing various files in FIG. 10 (third embodiment)

A third embodiment of the present invention will be described with reference to FIGS. 10 to 12 in conjunction with FIG. 1.

A third embodiment is different from the first embodiment shown in FIG. 1 in that a system of the third embodiment has a multimedia file. The multimedia file is used to visibly display a sentence relating to transmission of tones. In other words, the multimedia file is a file for displaying an image or video relating to tone transmission of a text file or compressed data.

Figure 10:
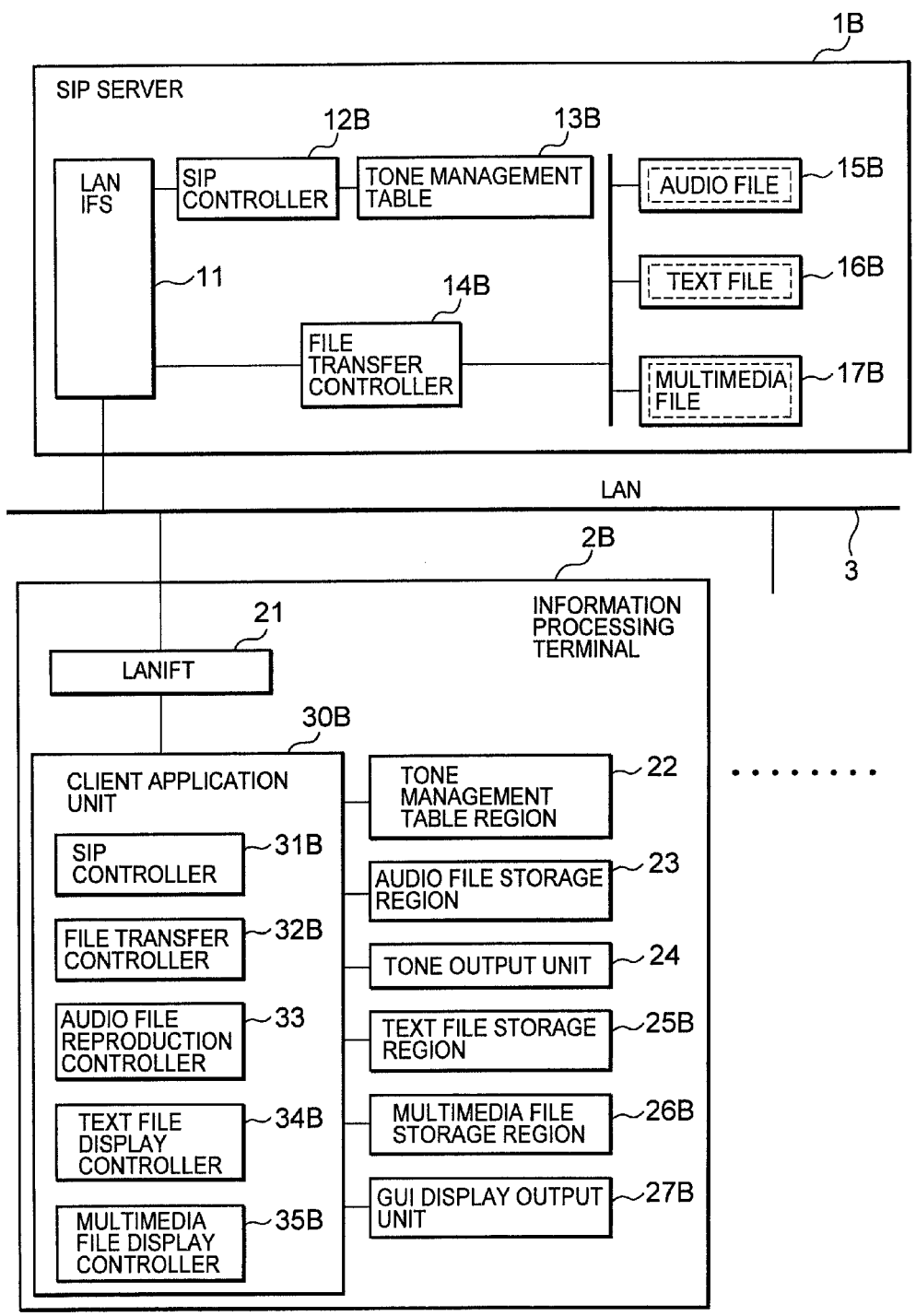
FIG. 10 is an explanatory block diagram showing a sound output setting system for use in information processing terminals according another embodiment of the present invention (third embodiment)

As shown in FIG. 10, a SIP server 1B has storage regions for a text file 16B and a multimedia file 17B, in addition to a LANIFS 11, a SIP controller 12B, a tone management table 13B, a file transfer controller 14B, and a storage region for an audio file 15B. An information processing terminal 2B has a text file storage region 25B, a multimedia file storage region 26B, and a GUI (graphical user interface) display output unit 27B, in addition to a LANIFT 21, a tone management table region 22, an audio file storage region 23, a tone output unit 24B, and a client application unit 30B. The client application unit 30B has a text file display controller 34B and a multimedia file display controller 35B in addition to a SIP controller 31B, a file transfer controller 32B, and an audio file reproduction controller 33.

In a tone management table 13B shown in FIG. 11, files in standard formats for Windows (registered trademark) are contained for each of tone IDs. These files include WAV (wave files) in audio format, TXT (text) files in text format, and AVI (Audio Video Interleaving) files for multimedia in video with audio format. FIG. 12 shows examples of these files.

The audio files, text files, and multimedia files are separated in their respective blocks. However, these files may be stored in a single audio file in a mixed form. Accordingly, the illustration can be made such that the output by audio reproduction and image display is also controlled by a single reproduction controller. In this case, the system configuration is the same as that of the first embodiment.

The control procedure according to the third embodiment is therefore characterized by the control for acquiring a file defined in the tone management table when the audio file is downloaded. According to the third embodiment, the file to be acquired is not limited to an audio file but any of those files defined in the tone management table. Further, the audio file reproduction instruction of the first embodiment corresponds to an instruction to reproduce or display a selected file. The tone transmission to the user of the information processing terminal is represented not only by sounds but also by display of text, or image or video.

This configuration makes it possible to notify the user by generating the output sound of the information processing terminal not only as an audible signal that can be obtained as voice from an ear piece or a speaker, but also as a visible signal that can be obtained as a text and/or an image on the screen.

Fourth Embodiment

A fourth embodiment of the present invention will be described with reference to FIGS. 13 and 14 in conjunction with FIGS. 1 and 5.

Figure 13:
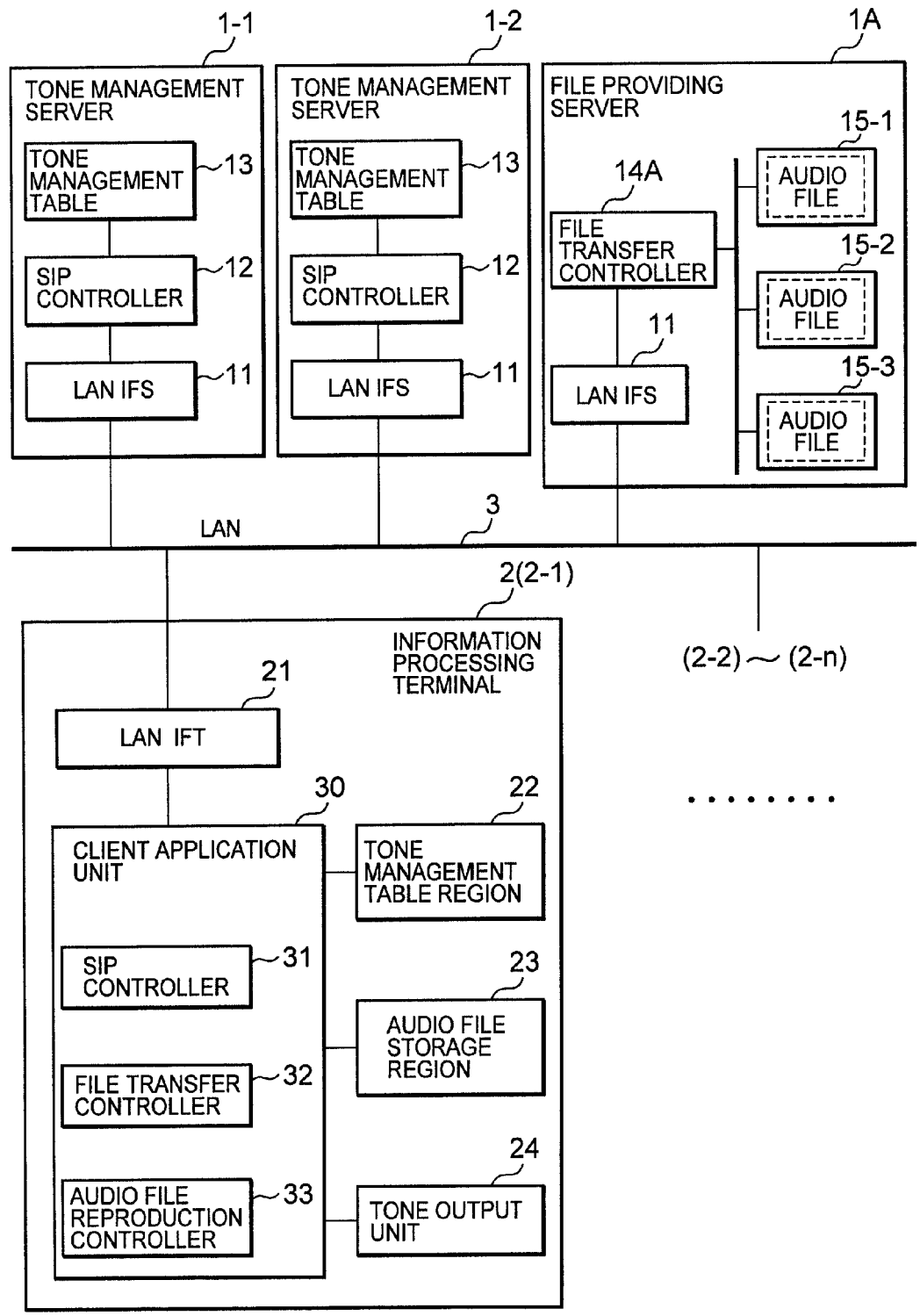
FIG. 13 is an explanatory block diagram showing a sound output setting system for use in information processing terminals according to another embodiment of the present invention (fourth embodiment)

The fourth embodiment shown in FIG. 13 is different from the first embodiment shown in FIG. 1 in that there are provided a plurality of SIP servers, one of which serves as a file providing server 1A and the others serve as tone management servers 1-1 and 1-2. As shown in FIG. 13, each of the tone management servers 1-1 and 1-2 includes a LANIFS 11, a SIP controller 12, and a tone management table 13. The file providing server 1A has a LANIFS 11, a file transfer controller 14A, and a plurality of audio file storage regions 15-1, 15-2 and 15-3.

Figure 5:
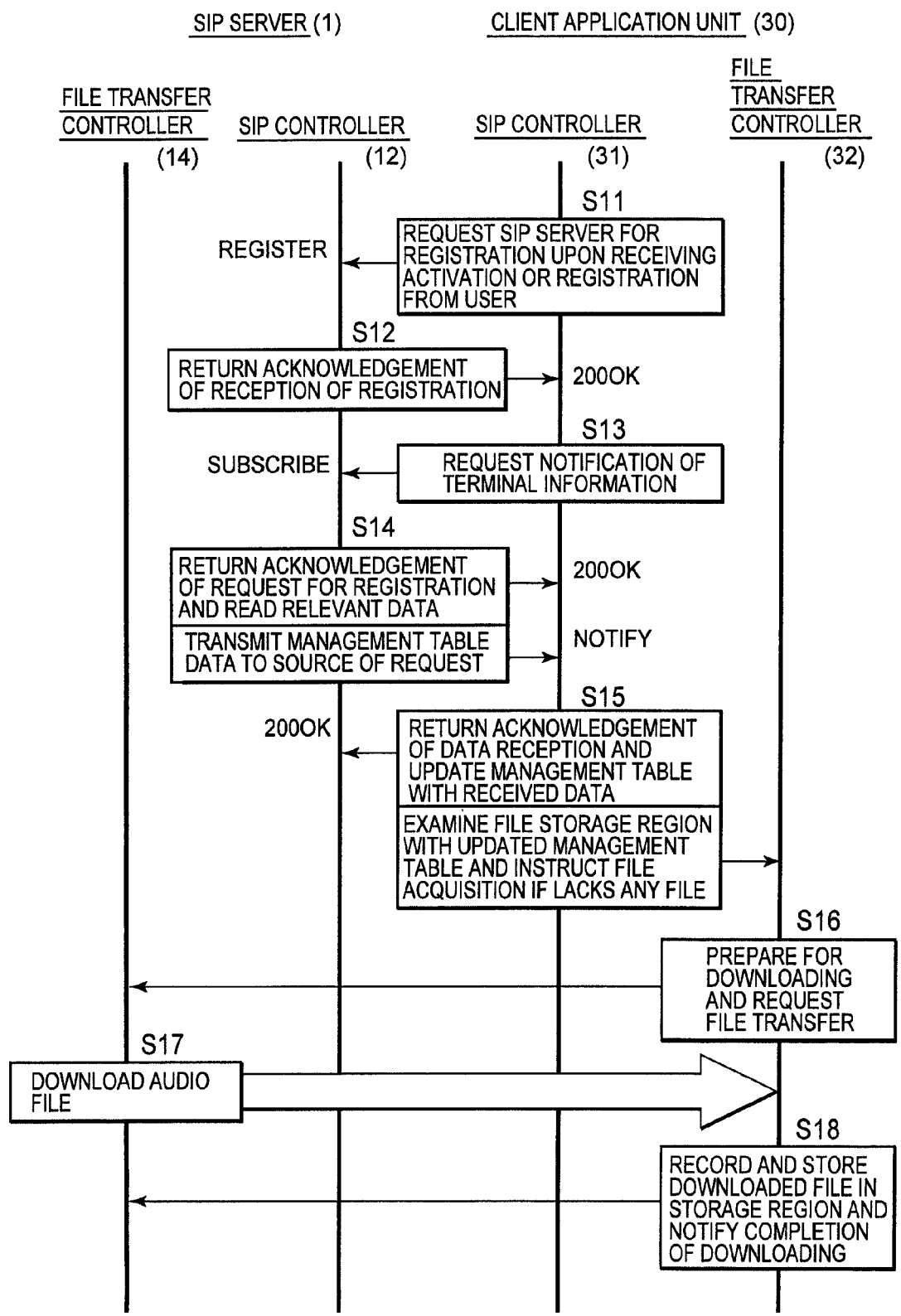
FIG. 5 is an explanatory sequence chart showing an example of operation procedures relating to audio file downloading of the sound output setting system in FIG. 1 (first embodiment)
Figure 14:
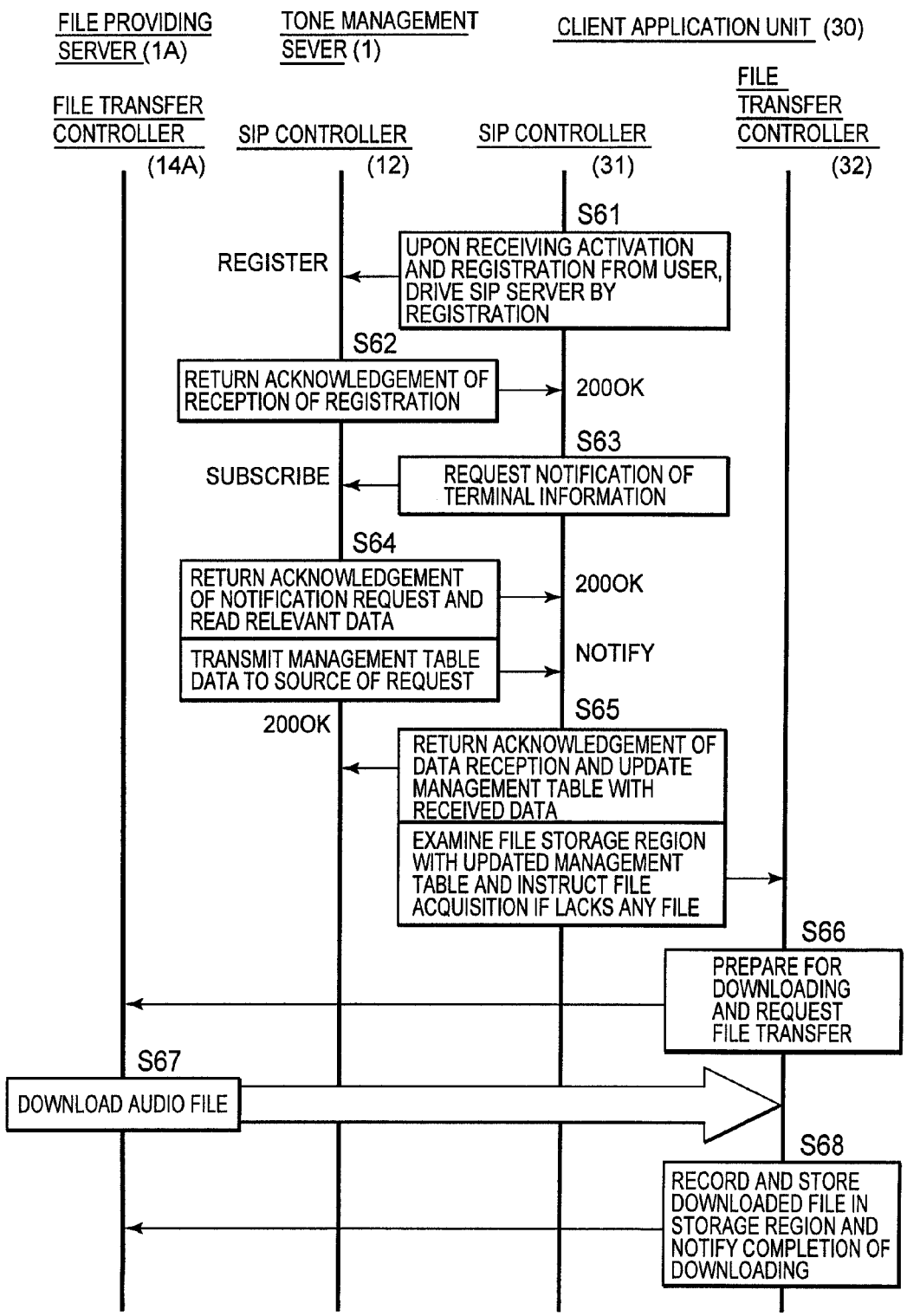
FIG. 14 is an explanatory sequence chart showing an example of operation procedures relating to audio file downloading of the sound output setting system in FIG. 13 (fourth embodiment)

FIG. 14 is different from FIG. 5 in that the file transfer controller 14A is used in place of the file transfer controller 14 and is included in the file providing server 1A. The audio file storage regions 15-1, 15-2 and 15-3 are also included in the file providing server 1A. The SIP controller 12 is included in each of the tone management server 1-1 and 1-2. The steps, namely steps S61 to S68 are the same as steps S11 to S18 and thus the description thereof will be omitted.

This configuration is applicable to a case in which the SIP server is unable to ensure a sufficient storage area for the audio files. This is because, according to the fourth embodiment, the file providing server capable of ensuring a sufficient storage area for the audio files is provided.

Fifth Embodiment

A fifth embodiment of the present invention will be described with reference to FIG. 15 in conjunction with FIG. 13.

Figure 15:
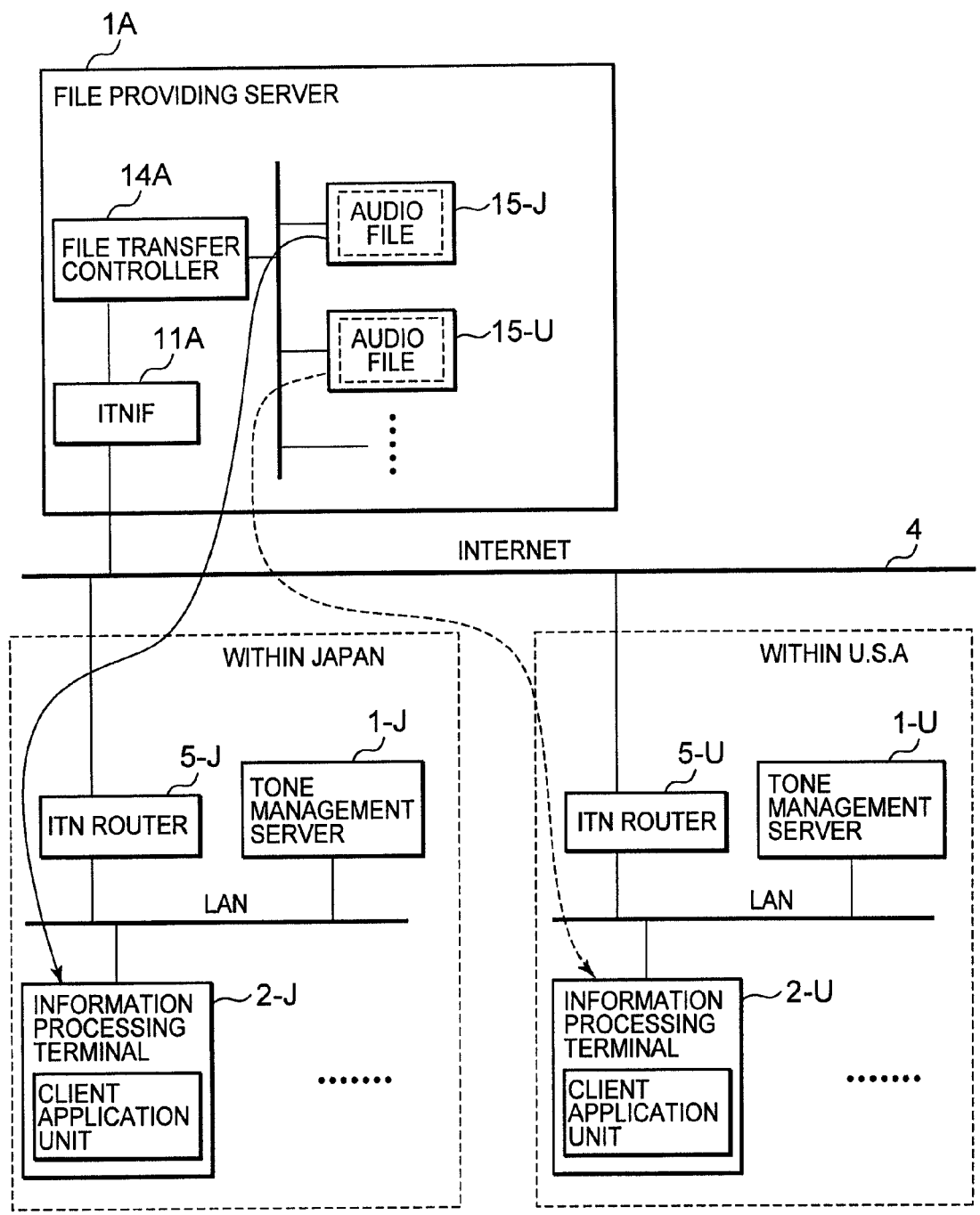
FIG. 15 is an explanatory block diagram showing a sound output setting system for use in information processing terminals according to another embodiment of the present invention (fifth embodiment).

The fifth embodiment shown in FIG. 15 is different from the fourth embodiment shown in FIG. 13 in that the file providing server 1A is connected to the Internet 4. Therefore, tone management servers 1-J and 1-U, and information processing terminals 2-J and 2-U are also connected to the Internet 4 by way of the LAN and ITN (Internet) routers 5-J and 5-U, respectively.

For example, a plurality of the information processing terminals 2-J are connected to an ITN router 5-J and a SIP server 1-J via the LAN, forming one private telephone system in Japan. A plurality of the information processing terminals 2-U are connected to an ITN router 5-U and a SIP server 1-U via the LAN, forming one private telephone system in the United States. Accordingly, the file providing server 1A possesses country-by-country audio files in the respective storage regions, so as to be included in the audio file storage region 15-J for Japan and the audio file storage region 15-U for the United States respectively.

The blocks show in FIG. 15 have the same functions and effects as those described above, and therefore the description thereof will be omitted.

This configuration enables the tone management servers 1-J and 1-U to define output sounds corresponding to the respective countries. Further, the file providing server 1A collectively stores various files in common for the various countries, and this is effective for the consolidated file management.

As described in the description of the embodiments above, the sound output setting system for the information processing terminal according to the present invention implements data transfer of a management table and audio files associated therewith from the SIP server at a predetermined time, for example not only when an information processing terminal requests the SIP server for registration, but also when an audio file is newly registered in the audio file storage region of the SIP server, the sound output setting system implements the data transfer of the management table and audio files associated therewith. Accordingly, the information processing terminal is enabled to update the recorded data in its own storage region by acquiring the transferred data and comparing the same with the own recorded data. This makes it possible to update the audio file stored in the information processing terminal to the latest data in the SIP server, making the unification easy and secure.

As a result, the SIP server is enabled to easily transfer a minimum range of audio files to the information processing terminals at the beginning during the installation of the system, and to control the sound of the various information processing terminals. This saves the users of the information processing terminals from a lot of troubles and eliminates the need of reconstruction of the application.

According to the present invention as mentioned above by the embodiments, an information processing terminal in the IP network is able to acquire, on request, output sound files collectively registered in the server using the SIP. This facilitates the management of files by the user at the information processing terminal. Further, the unified management of the files with the server is made possible for various international regions. Accordingly, when a telephone exchange serving as the server is connected to telephone terminals serving as the information processing terminals, the communication control is not necessarily limited to SIP, but the present invention is applicable to any telephone system as long as it is designed such that audio files are transmitted while being contained in messages exchanged via a network.

What is claimed is:

1. A sound output setting system for use in information processing terminals comprising at least one SIP server and first and n-th information processing terminals connected via a network using Session Initiation Protocol (SIP) where n represents a positive integer which is not less than two, wherein:

the first through the n-th information processing terminals are provided with first through n-th management table recording regions having first through n-th management tables for recording correspondence relationship between types of output sounds and their identification codes and first through n-th audio file storage regions for recording a plurality of audio files corresponding to the identification codes, respectively, each of the first through the n-th information processing terminals does not include other management table recording regions of other information processing terminals and other audio file storage regions of other information processing terminals;

the SIP server is provided with a tone management table having the first through the n-th management tables and a server audio file storage region for storing all the audio files expected to be used in the system;

the first through n-th information processing terminals have first through n-th SIP client application table units for acquiring data in the first through the n-th management tables of the tone management table of the SIP server at a predetermined time, respectively, and comparing its own recorded data in the first through the n-th management tables with the acquired data to update the audio files recorded in the first through the n-th audio file storage regions so as to match the recorded data with the acquired data, respectively; and the SIP server operates as an IP telephone exchange, and the information processing terminals serve as IP telephone terminals.

2. The sound output setting system for use in information processing terminals according to claim 1, wherein said predetermined time is a time when the SIP server notifies the relevant management table and audio file to the first through the n-th information processing terminals by reason that each of the first through the n-th information processing terminals requests the SIP server for registration or an audio file is newly registered in the server audio file storage region of the SIP server.

3. The sound output setting system for use in information processing terminals according to claim 1, wherein the first through the n-th management tables are provided in the SIP server in association with the first through the n-th information processing terminals, respectively, and provided in the first through the n-th information processing terminals in association with the first through the n-th audio file storage regions used by the first through the n-th information processing terminals, respectively.

4. The sound output setting system for use in information processing terminals according to claim 1, wherein the SIP server and the first through the n-th information processing terminals each have, in addition to the audio file, a text file, a multimedia file and storage regions thereof in correspondence with the output sound identification code.

5. The sound output setting system for use in information processing terminals according to claim 1, wherein the sound output setting system comprises (n+1) SIP servers, one of the (n+1) SIP servers serves as a file providing server having the server audio file storage region for storing all the audio files, and the remaining n SIP servers serve as first through n-th tone management servers having the first through the n-th management tables corresponding to the first through the n-th information processing terminals, respectively; and the first through the n-th tone management servers retrieve audio files corresponding to the first through the n-th information processing terminals from the file providing server, respectively, and transmit the retrieved files to the first through the n-th information processing terminals, respectively.

6. The sound output setting system for use in information processing terminals according to claim 5, wherein first through n-th systems are formed by respectively connecting the first through the n-th tone management servers to the first through the n-th information processing terminals associated therewith via a local area network (LAN), and the first through the n-th systems are connected to the file providing server via the Internet.

* * * * *

UNITED STATES PATENT AND TRADEMARK OFFICE
CERTIFICATE OF CORRECTION

PATENT NO. : 9,253,312 B2
APPLICATION NO. : 12/014519
DATED : February 2, 2016
INVENTOR(S) : Takashi Horikoshi It is certified that error appears in the above-identified patent and that said Letters Patent is hereby corrected as shown below:

Specification

Column 12, Line 16: Delete "91" and insert --24-1--

Column 13, Line 54: Delete "23-1." and insert --22-1.--

Column 17, Line 4: Delete "24B" and insert --24--

Signed and Sealed this
Second Day of August, 2016

Michelle K. Lee
*Director of the United States Patent and Trademark Office*